US012578419B2

(12) United States Patent　　(10) Patent No.:　US 12,578,419 B2
Berggren et al.　　　　　　　　　(45) Date of Patent:　　　Mar. 17, 2026

(54) METHODS FOR SUPPORTING POSITIONING OF A WIRELESS DEVICE AND RELATED NETWORK NODES AND WIRELESS DEVICE

(71) Applicant: Sony Group Corporation, Tokyo (JP)

(72) Inventors: Anders Berggren, Lund (SE); Basuki Priyanto, Lund (SE); Jose Flordelis, Lund (SE); Johan Hill, Lund (SE)

(73) Assignee: Sony Group Corporation, Tokyo (JP)

( * ) Notice: Subject to any disclaimer, the term of this patent is extended or adjusted under 35 U.S.C. 154(b) by 795 days.

(21) Appl. No.: 17/908,213

(22) PCT Filed: Mar. 5, 2021

(86) PCT No.: PCT/EP2021/055667
§ 371 (c)(1),
(2) Date: Aug. 30, 2022

(87) PCT Pub. No.: WO2021/197757
PCT Pub. Date: Oct. 7, 2021

(65) Prior Publication Data
US 2023/0127908 A1　　Apr. 27, 2023

(30) Foreign Application Priority Data
Mar. 31, 2020　(SE) ................................... 2050366-0

(51) Int. Cl.
*H04W 64/00*　　(2009.01)
*G01S 5/02*　　(2010.01)
(52) U.S. Cl.
CPC .......... *G01S 5/0268* (2013.01); *G01S 5/0236* (2013.01); *H04W 64/00* (2013.01)
(58) Field of Classification Search
CPC ..... G01S 5/0268; G01S 5/0236; H04W 64/00
(Continued)

(56) References Cited

U.S. PATENT DOCUMENTS 9,648,573 B2 * 5/2017 Siomina ................ H04W 24/08
2016/0360370 A1 * 12/2016 Edge ..................... H04W 64/00
(Continued)

FOREIGN PATENT DOCUMENTS

EP　　3139676 A1　　3/2017
WO　2017026928 A1　　2/2017
(Continued)

OTHER PUBLICATIONS

International Search Report and Written Opinion from corresponding International Application No. PCT/EP2021/055667, mailed on May 27, 2021, 12 pages.
(Continued)

*Primary Examiner* — Jinsong Hu
(74) *Attorney, Agent, or Firm* — Tucker Ellis LLP

(57)　　　　　ABSTRACT

A method is disclosed, performed by a network node in a wireless communications network, for supporting positioning of a wireless device. The wireless communications network comprises a first set of radio network nodes having a first positioning reference signal configuration and a second set of radio network nodes having a second positioning reference signal configuration. The first positioning reference signal configuration provides a different positioning requirement than the second reference signal configuration. The method comprises signaling, to the wireless device, a first positioning request comprising a first indication of a positioning requirement of a first positioning measurement. The method comprises obtaining a first estimated position of the wireless device, based on a first positioning measurement for the wireless device. The first positioning measurement is associated with the first set of radio network nodes. The method comprises signaling, to the subset of the second set of radio network nodes, an indication to participate in the second positioning measure- (Continued)

ment. The second indication of the positioning requirement of the second positioning measurement indicates a different positioning requirement than the first indication of the positioning requirement.

19 Claims, 12 Drawing Sheets

(58) Field of Classification Search
 USPC ...................................................... 455/456.1
 See application file for complete search history.

(56)        References Cited

U.S. PATENT DOCUMENTS

| | | | |
|---|---|---|---|
| 2018/0146332 A1 * | 5/2018 | Opshaug | ................... G01S 5/10 |
| 2018/0206063 A1 | 7/2018 | Frenger | |
| 2019/0037338 A1 | 1/2019 | Edge | |
| 2019/0230475 A1 | 7/2019 | Edge | |
| 2020/0154240 A1 * | 5/2020 | Edge | ..................... H04W 4/029 |
| 2020/0344712 A1 * | 10/2020 | Akkarakaran | ........ H04L 5/0048 |
| 2021/0092549 A1 * | 3/2021 | Frenger | ................... H04W 4/02 |

FOREIGN PATENT DOCUMENTS

| | | | |
|---|---|---|---|
| WO | 2018143870 A1 | 8/2018 | |
| WO | 2020026211 A1 | 2/2020 | |

OTHER PUBLICATIONS

Office Action and Search Report from corresponding Swedish Application No. 2050366-0, mailed on Feb. 24, 2021, 12 pages.
ZTE, et al., "RN positioning impacts on NRPPa", 3GPP TSG RAN WG3 Meeting #106, R3-196613, Nov. 18-22, 2019, 5 pages.

* cited by examiner

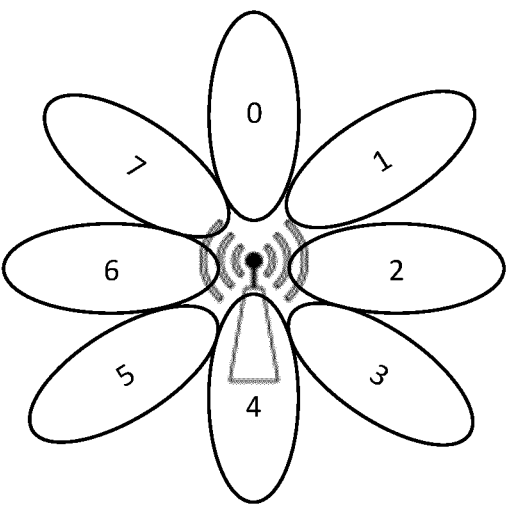
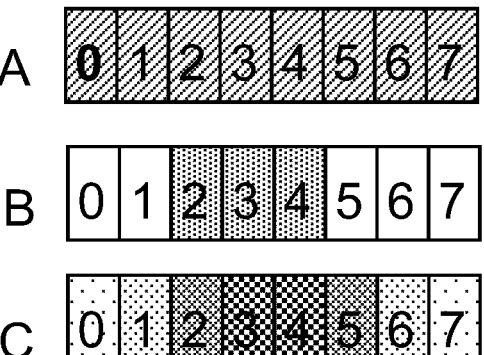
Fig. 3

Figure 4A:
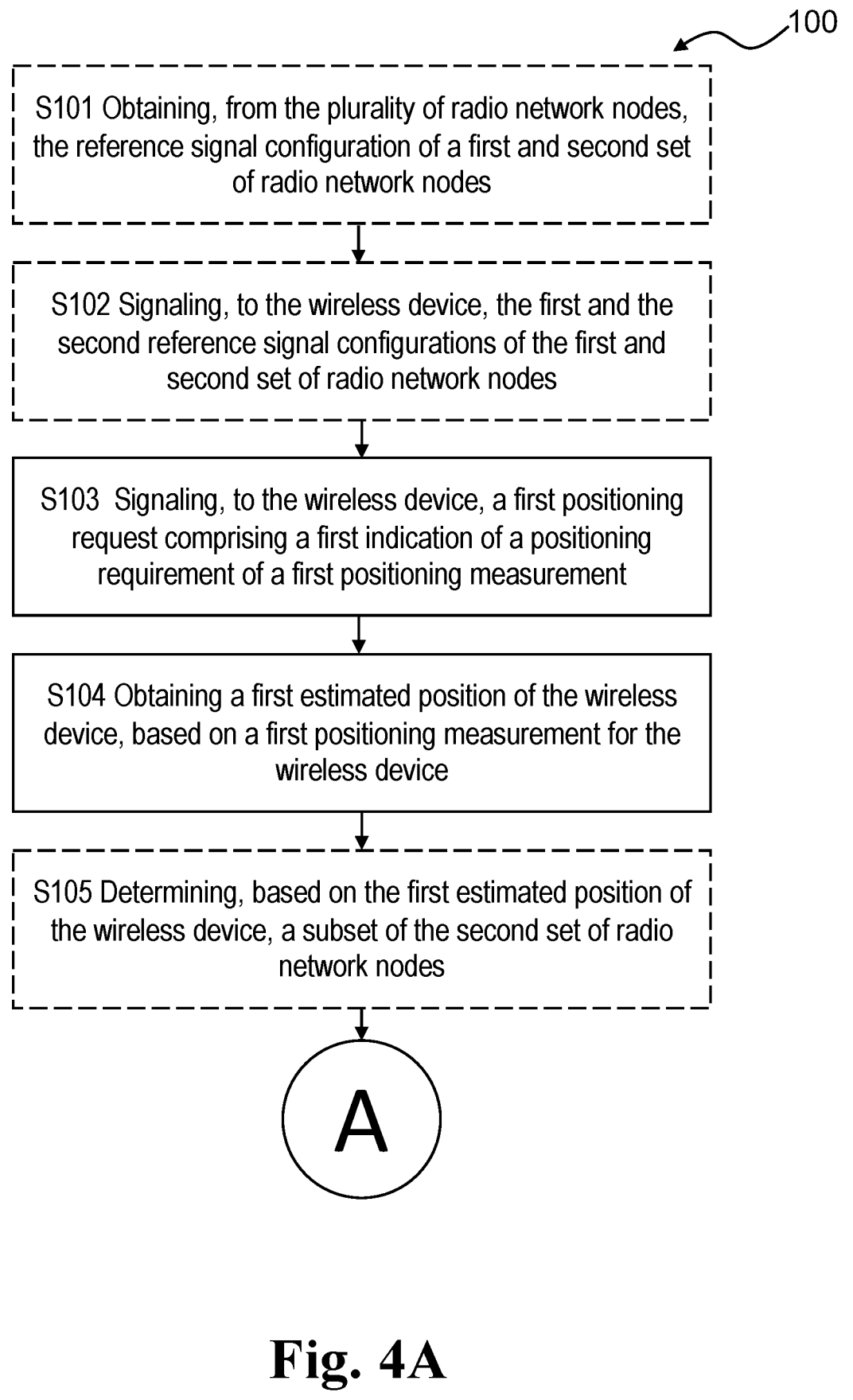

100

S101 Obtaining, from the plurality of radio network nodes, the reference signal configuration of a first and second set of radio network nodes S102 Signaling, to the wireless device, the first and the second reference signal configurations of the first and second set of radio network nodes S103  Signaling, to the wireless device, a first positioning request comprising a first indication of a positioning requirement of a first positioning measurement S104 Obtaining a first estimated position of the wireless device, based on a first positioning measurement for the wireless device S105 Determining, based on the first estimated position of the wireless device, a subset of the second set of radio network nodes

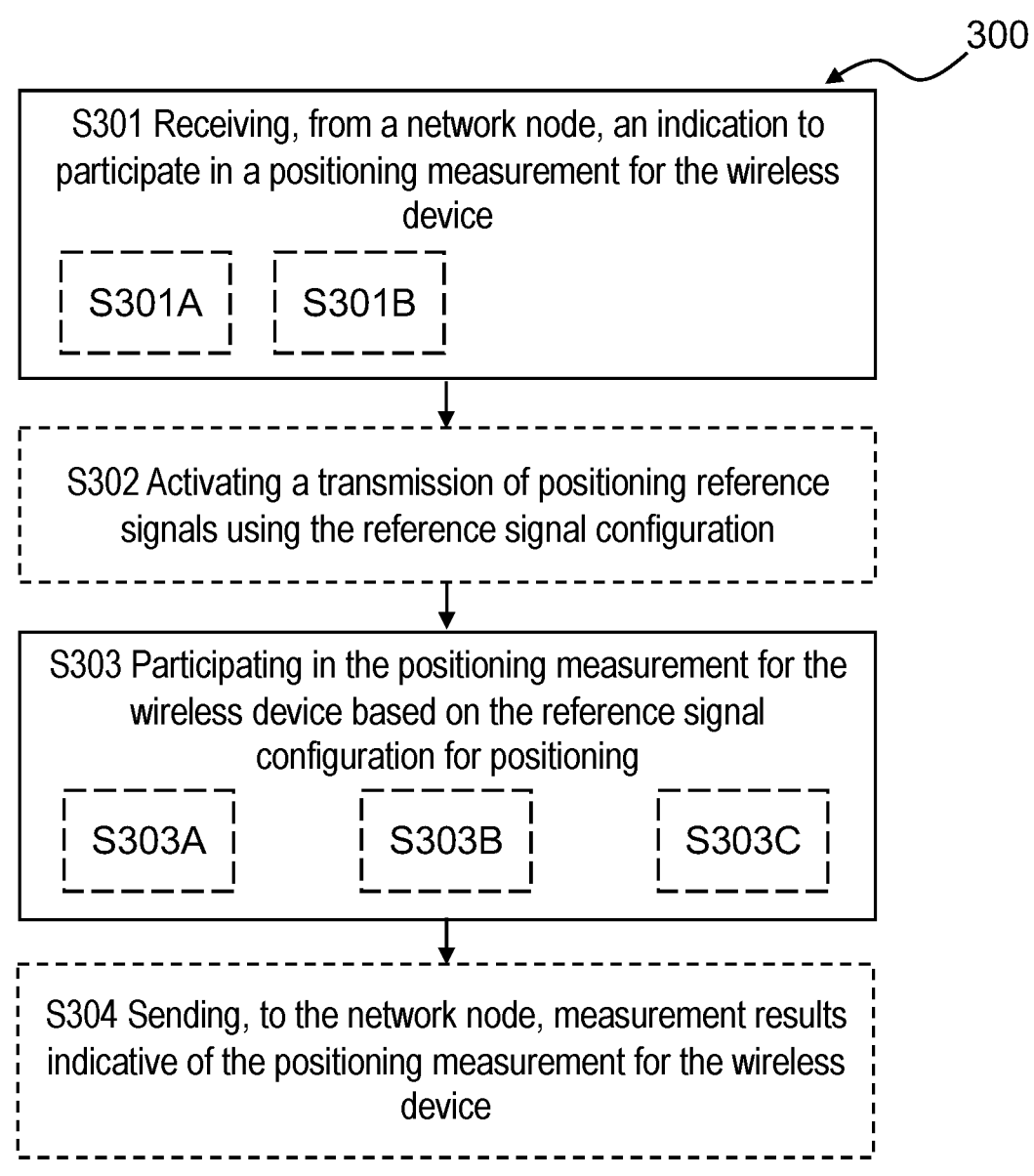

300

S301 Receiving, from a network node, an indication to participate in a positioning measurement for the wireless device

S301A     S301B

S302 Activating a transmission of positioning reference signals using the reference signal configuration S303 Participating in the positioning measurement for the wireless device based on the reference signal configuration for positioning

S303A          S303B          S303C

S304 Sending, to the network node, measurement results indicative of the positioning measurement for the wireless device

METHODS FOR SUPPORTING POSITIONING OF A WIRELESS DEVICE AND RELATED NETWORK NODES AND WIRELESS DEVICE

The present disclosure relates to methods for handling positioning of a wireless device, related network nodes and related wireless devices.

BACKGROUND

The 3$^{rd}$ Generation Partnership Project (3GPP) New Radio (NR) has introduced support for positioning of a User Equipment (UE), in 3GPP Rel. 16. Both downlink (DL) based and uplink (UL) based positioning are supported. For DL based positioning the UE may perform at least one positioning measurement and may then report to a location server (LS) for positioning estimation. The location server (LS) may perform positioning estimation after a reception of multiple positioning measurements. In legacy LTE, the LS requires at least three positioning measurements from three base-stations for a multilateration based positioning estimation. Alternatively, the UE may perform both measurement and positioning estimation assuming the UE has collected required and/or sufficient information. Furthermore, NR positioning techniques in 3GPP Rel. 16 has adopted some NR essential features, such as support of mmWave frequency (also known as Frequency Range 2), beam management, supporting multiple numerologies, etc.

The initial target of NR positioning for both regulatory and commercial requirements are described in TR 38.855 V 16.0.0. The positioning requirements in 3GPP are continuously evolving in order to support better accuracy and lower latency. The study on positioning requirements related to the communication for automation in vertical domains are described in 3GPP TR 22.804 V16.2.0. The 3GPP has also specified positioning service requirements for the 5G system and described in 3GPP TS 22.261 V16.7.0. Stringent positioning requirements are typically required for industrial applications, which may also be referred to as commercial requirements, where for example centimeter positioning accuracy in horizontal direction and/or vertical direction may be required. Hence, finding positioning techniques to fulfil such requirements in various use-cases and scenarios is proving challenging.

One possible solution is to deploy a densified network in which the network deploys many reference points (such as Transmission/Reception Points (TRPs), and/or gNBs) close to each other in a relatively small area. The reference points, which have known positions, may transmit reference signals and the UE may perform positioning measurements based on the transmitted reference signals. However, the huge number of reference points transmitting with limited resources may create signal interference, which will degrade a quality of the reference signals received by the UE. Furthermore, the positioning measurement quality and positioning estimate will be negatively affected. Hence, here is a need to minimize interference in a densified network scenario.

SUMMARY

In legacy LTE and NR, positioning estimation methods use a one-step approach having a predefined reference signal pattern and allocation. 3GPP Rel. 17 targets higher accuracy and multi-level of requirements compared to Rel. 16. Multi-level requirements mean that different applications, such as different types of Wireless Devices (WDs) may have different requirements. Accordingly, there is a need for devices and methods for positioning of a wireless device which mitigate, alleviate or address the shortcomings existing and provide improved accuracy of the positioning. A method of transmission of positioning reference signals with coordinated resources/power allocation in dense network to minimize interference and obtaining an improved accuracy of positioning of a wireless device is disclosed. In other words, the disclosed technique may be seen as a method having coordinated reference signals transmission. Subsequently, this allows a UE to perform two-step positioning, wherein a first positioning step provides a coarse positioning, and a second step provides a fine positioning of the wireless device.

A method is disclosed, performed by a network node in a wireless communications network, for supporting positioning of a wireless device. The wireless communications network comprises a first set of radio network nodes having a first positioning reference signal configuration and a second set of radio network nodes having a second positioning reference signal configuration. The first positioning reference signal configuration provides a different positioning requirement than the second reference signal configuration. The method comprises signaling, to the wireless device, a first positioning request comprising a first indication of a positioning requirement of a first positioning measurement. The method comprises obtaining a first estimated position of the wireless device, based on a first positioning measurement for the wireless device. The first positioning measurement is associated with the first set of radio network nodes. The method comprises signaling, to a subset of the second set of radio network nodes, an indication to participate in the second positioning measurement. The method further comprises signaling, to the wireless device, a second positioning request comprising a second indication of a positioning requirement of a second positioning measurement. The second indication of the positioning requirement of the second positioning measurement indicates a different positioning requirement than the first indication of the positioning requirement.

Further, a network node is provided, the network node comprising a memory circuitry, a processor circuitry, and an interface. The network node is configured to signal, to a wireless device, a first positioning request comprising a first indication of a positioning requirement of a first positioning measurement. The network node is configured to obtain a first estimated position of the wireless device, based on a first positioning measurement for the wireless device. The first positioning measurement is associated with the first set of radio network nodes. The network node is configured to signal, to the subset of the second set of radio network nodes, an indication to participate in the second positioning measurement. The network node is configured to signal, to the wireless device, a second positioning request comprising a second indication of a positioning requirement of a second positioning measurement. The second indication of the positioning requirement of the second positioning measurement indicates a different positioning requirement than the first indication of the positioning requirement.

The disclosed network node and related method provide an improved accuracy (such as high-accuracy) in positioning of the wireless device while minimizing the interference level in the wireless communication network.

Further, a method is disclosed, performed in a wireless device in a wireless communications network, for supporting positioning of the wireless device. The wireless communications network comprises a first set of radio network nodes having a first positioning reference signal configuration and a second set of radio network nodes having a second positioning reference signal configuration. The first reference signal configuration provides a different positioning requirement than the second reference signal configuration. The method comprises obtaining a first positioning request comprising a first requirement indication. The first requirement indication indicates a positioning requirement of a first positioning measurement. The method comprises participating in the first positioning measurement based on a first reference signal configuration, wherein the first reference signal configuration is determined based on the first requirement indication. The method comprises obtaining a second positioning request comprising a second requirement indication, wherein the second requirement indication indicates a positioning requirement of a second positioning measurement. The second requirement indication indicates a different positioning requirement than the first requirement indication. The method comprises participating in a second positioning measurement using the second reference signal configuration. The second reference signal configuration is determined based on the second requirement indication.

Further, a wireless device is provided, the wireless device comprising a memory circuitry, a processor circuitry, and a wireless interface. The wireless device is configured to obtain a first positioning request comprising a first requirement indication, wherein the first requirement indication indicates a positioning requirement of a first positioning measurement. The wireless device is configured to participate in the first positioning measurement based on a first reference signal configuration. The first reference signal configuration is determined based on the first requirement indication. The wireless device is configured to obtain a second positioning request comprising a second requirement indication. The second requirement indication indicates a positioning requirement of a second positioning measurement, wherein the second requirement indication indicates a different positioning requirement than the first requirement indication. The wireless device is configured to participate in a second positioning measurement using the second reference signal configuration, wherein the second reference signal configuration is determined based on the second requirement indication.

The disclosed wireless device and related method support an improved accuracy (such as high-accuracy) in positioning of the wireless device at the network node. The disclosed wireless device and related method also support a coordinated transmission of positioning reference signals which reduces interference due to reference signal transmission.

Further, a method is disclosed, performed in a radio network node, for supporting positioning of a wireless device, wherein the radio network node has a reference signal configuration for positioning. The method comprises receiving, from a network node, an indication to participate in a positioning measurement for the wireless device. The method comprises participating in the positioning measurement for the wireless device based on the reference signal configuration for positioning.

Further, a radio network node is provided, the radio network node comprising a memory circuitry, a processor circuitry, and a wireless interface. The radio network node is configured to receive, from a network node, an indication to participate in a positioning measurement for the wireless device. The radio network node is configured to participate in the positioning measurement for the wireless device based on the reference signal configuration for positioning.

It is an advantage of the present disclosure that an accuracy of the positioning procedure can be improved while reducing interference experienced in the wireless communications network. By coordinating the transmission of positioning reference signals, the interference due to reference signal transmissions is reduced.

The present disclosure enables an improved accuracy (such as high-accuracy) in positioning of the wireless device in environments requiring a dense cell deployment, required by, e.g., industrial internet-of-thing (IoT) applications.

The present disclosure enables an enhanced energy efficiency since only reference points (such as radio network nodes, such as base stations) participating in a first positioning measurement need to be always on. Reference points participating in a second positioning step may only need to be activated on-demand, when there is a need for accurate positioning of the WD, and they may transmit with a reduced power which reduces interference in the wireless communications network.

BRIEF DESCRIPTION OF THE DRAWINGS

The above and other features and advantages of the present disclosure will become readily apparent to those skilled in the art by the following detailed description of example embodiments thereof with reference to the attached drawings, in which:

FIG. 3 is a diagram illustrating a resource pattern for transmitting positioning reference signals, FIGS. 4A-4B is a flow-chart illustrating an example method, performed in a network node of a wireless communication system, for supporting positioning of a wireless device according to this disclosure, FIG. 6 is a flow-chart illustrating an example method, performed in a radio network node of a wireless communication system, for supporting positioning of a wireless device according to this disclosure.

DETAILED DESCRIPTION

Figure 1:
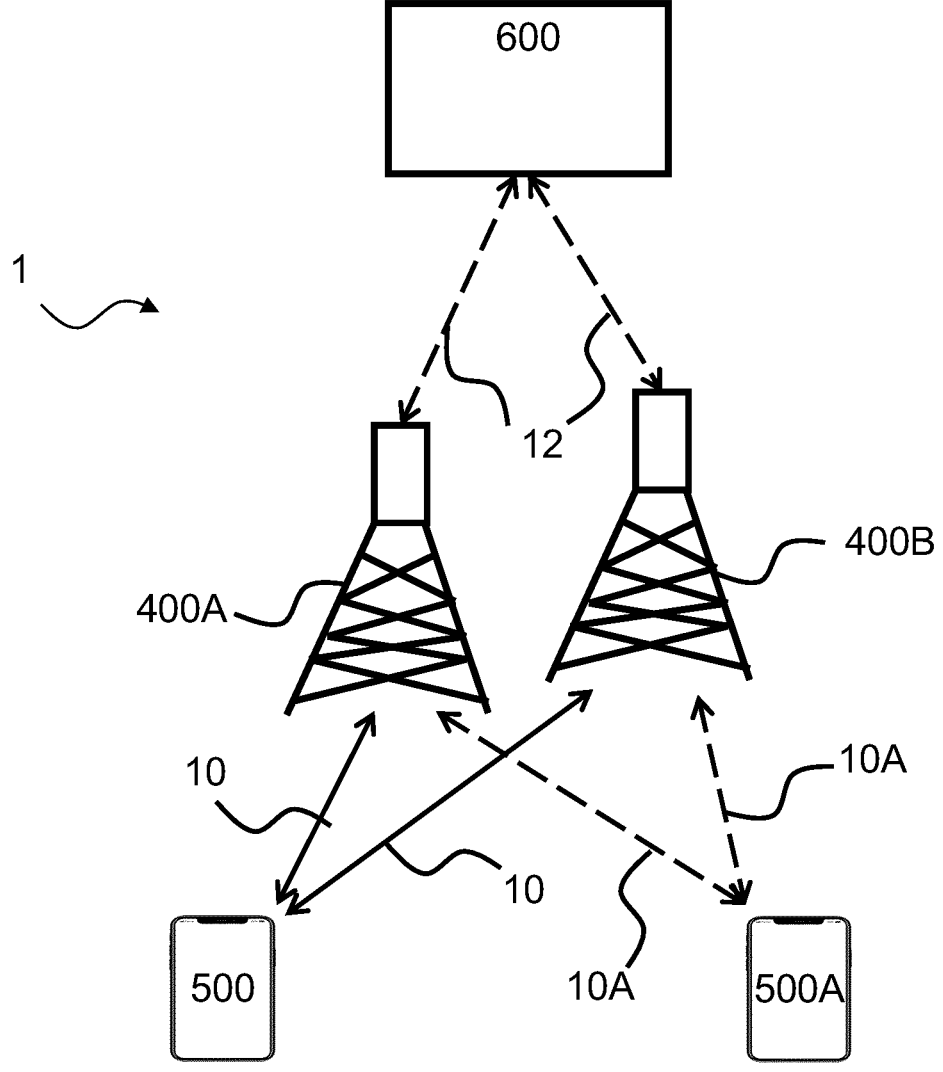
FIG. 1 is a diagram illustrating an example wireless communication system comprising an example network node, an example radio network node and an example wireless device according to this disclosure.

Various example embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The embodiments disclosed herein, address the above-mentioned issues and provide a high accuracy positioning procedure while reducing an overhead of positioning resources and reducing latency.

FIG. 1 is a diagram illustrating an example wireless communication system 1 comprising a cellular system, e.g., a 3GPP wireless communication system. The wireless communication system 1 comprises one or more wireless devices 500 and/or one or more radio network nodes 400A, 400B.

A radio network node disclosed herein refers to a radio access network node operating in the radio access network, such as a base station, an evolved Node B (eNB), or a gNB or Transmission Point (TP) or Transmission and Reception Point (TRP).

The wireless communication system 1 described herein may comprise one or more wireless devices 500, 500A, and/or one or more first radio network nodes 400A and one or more second radio network nodes 400B, such as one or more of: a base station, an eNB, a gNB and/or an access point.

A wireless device may refer to a mobile device and/or a user equipment (UE).

The wireless device 500, 500A may be configured to communicate with the radio network nodes 400A, 400B via a wireless link (or radio access link) 10, 10A. The one or more first radio network nodes 400A may have a first positioning reference signal configuration for transmitting positioning reference signals. The one or more second radio network nodes 400B may have a second positioning reference signal configuration for transmitting positioning reference signals.

The wireless communication system 1 may further comprise a network node, such as a core network node 600, e.g., a Location Server (LS) or Evolved Serving Mobile Location Centre (E-SMLC) comprised in a core network.

The embodiments herein further provide a method to support two-step positioning estimates in order to improve accuracy of the positioning of the wireless device (possibly achieving a high accuracy positioning) while reducing interference experienced in the wireless communications network from a positioning measurement of the WD.

The network node, such as the LS, may obtain resource configurations, such as the resource set configurations, of the radio network nodes. The network node may select and/or trigger the positioning measurements. The embodiments herein consider different positioning measurements for different positioning requirements, such as required positioning accuracy and/or desired latency for the positioning.

The present disclosure provides a method for handling and/or supporting positioning of a wireless device, such as a UE. The method provides high accuracy positioning of the WD device while keeping interference in the wireless communications network on a low level.

A method for two-step positioning is provided herein, where a first positioning step provides a coarse positioning of the WD and a second positioning step provides a more accurate positioning. The first positioning step, such as a coarse accuracy step, may comprise performing a position- ing measurement of the WD based on a first number of beams, where each beam has a first beam-width, with a first transmit power, and/or a first resource allocation (such as first bandwidth) to estimate a first position of the WD. In some embodiments the first positioning step may comprise performing a positioning measurement based on legacy methods, such as Observed Time Difference of Arrival (OTDOA) or DL-OTDOA. In a second step, such as in a high accuracy step, a second positioning measurement may be performed with a second transmit power, a second resource allocation (such as a second bandwidth) and a second beam width to determine a more accurate position of the WD. The first number of beams may be less than the second number of beams, such that a higher number of beams is used in the second positioning step compared to the first positioning step. The first beam width may be wider than the second beam-width, such that the second beam width is narrower than the first beam width. The first resource allocation may be reduced (such as having a narrower bandwidth) in compared to the second resource allocation, such that the second resource allocation is larger (such as having a wider bandwidth) than the first resource allocation. The first transmit power may be higher than the second transmit power, such that the second transmit power is lower than the first transmit power.

Coordinated multi transmission point (TRP) reference signals, such as positioning reference signals, for downlink-based or uplink-based positioning, such as PRS or SRS, comprising a selection of radio network nodes, such as TRPs and/or BSs, based on measurement reports received during the first positioning step, may be used for the second positioning step. The positioning measurement may be a DL-based positioning measurement, in which the radio network node transmits reference signals, and the wireless device performs measurements on the transmitted reference signals. The DL-based positioning measurement may be based on RSRP measurement and/or RSTD measurement. The RSRP/RSTD measurements may be carried out based on the reception of downlink reference signals, such as downlink positioning reference signals (DL-PRS). The posi- tioning measurement may also be an UL-based positioning measurement, in which the wireless device transmits refer- ence signals, and the radio network node performs measure- ments on the transmitted reference signals. The UL-based positioning measurement may for example use Sounding Reference Signals (SRS) as reference signals, or wireless device based positioning where the wireless device calcu- lates its positioning estimate (such as coordinates) based on measurements of the reference signals, or Cell Identity (CID) based positioning techniques. Typically, wireless device based positioning can be enabled as long as the wireless device is provided with the coordinates of sur- rounding radio network nodes. The method may further provide positioning reference signal muting, and directional positioning reference signal power level settings to reduce interference in the wireless communications network while providing a high accuracy positioning of the WD. The second positioning step may use on-demand dynamically scheduled resources for transmitting positioning reference signals, wherein the dynamically scheduled resources may be determined based on the first estimated position of the WD. The network node, such as the LS, may obtain a measurement report based on the positioning step for each WD in the network, indicating whether the WD position estimates are available with coarse accuracy, fine accuracy, or not available.

Figure 2:
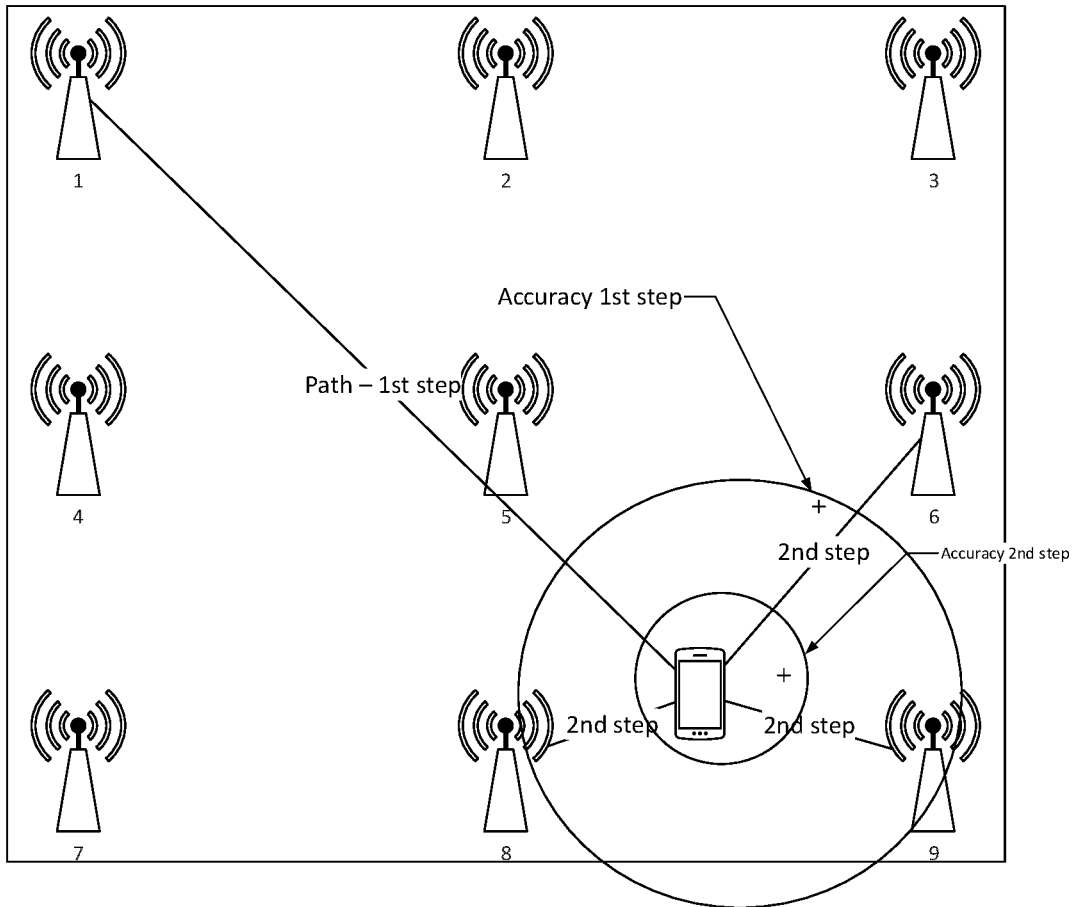
FIG. 2 is a diagram illustrating a two-step positioning of a WD in a dense network according to this disclosure.

FIG. 2 illustrates the two-step positioning method for the WD in a dense wireless communications network deploy- ment. The positioning measurement is in this example performed in DL. However, UL positioning measurements may also be used to determine the position of the wireless device. A combination of DL & UL positioning may however also be performed. The first positioning step may for example be performed with DL based positioning and the second positioning step may e-g—be performed with UL based positioning, or vice-versa. The wireless communications network comprises a plurality of radio network nodes, such as reference points wherein reference points 1-9 are shown in FIG. 2. One or more first reference points, such as the reference point 1 in FIG. 2, may be configured with the first positioning reference signal configuration, and may be configured to periodically transmit positioning reference signals using the first positioning reference signal configuration. One or more second reference points, such as the reference points 5, 6, 8 and 9, may be configured with the second positioning reference signal configuration. Initially, the second positioning reference signals configuration may be inactive, such that the one or more second reference points do not transmit positioning reference signals using the second positioning reference signal configuration. The WD being located in the wireless communications network may in the first step perform a first positioning measurement using the first positioning reference signals configuration on positioning reference signals transmitted by for example the reference point 1 to estimate a first position of the WD. The first estimated position may be a coarse estimate, such as a position estimation having a low accuracy. The network node, such as the LS, may, based on the first estimated position, select a number of reference points to participate in a second positioning measurement for the WD using the second positioning reference signals configuration. In the second step, the WD performs the second positioning measurement on positioning reference signals transmitted from the selected reference points to provide a more accurate position of the WD.

Coordination of the positioning reference signal transmission by the network node may take place in one or more of the following ways for example:

1) One or more first radio network node(s) (for example reference points, such as Transmission/Reception Points (TRP), or base stations, such as gNBs) of the wireless communications network may be configured to support, which may also be referred to as assist, one or more WDs in performing a first positioning measurement. The first positioning measurement may for example be a coarse positioning measurement. The one or more first reference points may have a first positioning reference signal configuration. The positioning reference signal configuration may define one or more characteristics of the positioning reference signal transmission. The first positioning reference signal configuration and/or the characteristics of the first positioning reference signal transmission may comprise one or more of the following:

a. High transmit power. The transmit power may be a transmit power per resource element for transmitting positioning reference signals. High transmit power may herein be understood as a transmit power being higher than a transmit power of a second positioning reference signal configuration, such as higher than the transmit power described in 2a below. The high transmit power may also be referred to as a default or normal transmit power.

b. One or a few wide beam(s). Wide beams may herein be understood as beams having a beam width wider than a beam width of the second positioning reference signal configuration, such as having a beam width wider than the beam width of the multiple beams described in 2b below. A few beams may herein be understood as the number of beams being less than the number of beams used in the second positioning reference signal configuration, such as being less than the number of beams described in 2b below. Positioning reference signal transmission using a beam is occupying a resource and this resource may be identified based on an ID, such as a resource ID. The number of beams of the first positioning reference signal configuration may thus be indicated by a number of resource IDs, wherein the number of resource IDs may be less than the resources IDs for the second positioning reference signal configuration described in 2B below.

c. Small resource allocation (such as narrower bandwidth). Small resource allocation may herein be understood as the resource allocation being smaller than a resource allocation for the second positioning reference signal configuration. The smaller resource allocation may for example be a narrower bandwidth than a bandwidth of the second positioning reference signal configuration.

d. Periodicity (such as an infrequent periodicity). The periodicity of the first positioning reference signal configuration may for example be less frequent than a periodicity of the second positioning reference signal configuration. The first positioning reference signal configuration may for example indicate that the radio network nodes are to transmit positioning reference signals periodically. The positioning reference signals may be transmitted continuously. Transmitted continuously herein means that the positioning reference signals are transmitted with a certain periodicity without having a limitation on the duration of the periodical transmission.

2) One or more second radio network nodes (such as reference points, such as TRP or base stations, such as gNBs) may be configured to support the one or more WDs in performing a second positioning measurement. The one or more second network nodes configured to support the one or more WDs in performing a second positioning measurement may herein be referred to as a second set of radio network nodes. The second positioning measurement may for example be a fine positioning measurement, such as a positioning measurement being finer than the first positioning measurement. The one or more second reference points, such as the one or more second radio network nodes, may have a second positioning reference signal configuration. The positioning reference signal configuration may define one or more characteristics of the positioning reference signal transmission. In one or more embodiments, the second positioning reference signal configuration may initially be inactive, such that the one or more second reference points are not transmitting positioning reference signals using the second positioning reference signal configuration. The one or more second reference points may be configured to transmit positioning reference signals for a certain time, such as by being activated for a duration of time, or by means of an activation and/or de-activation signal. The duration may for example be a one-time positioning reference signal transmission, multiple positioning reference signal transmission (such as transmitting positioning reference signals a predetermined number of times with a predetermined periodicity, such as transmitting positioning reference signals X number of times with a periodicity of Y ms, or transmitting positioning reference with a periodicity of Y ms for a predetermined duration of time Z), or a continuous transmission after receiving an "activation" signal and stops transmitting after receiving a "de-activation" signal.

The activation of the one or more second reference points may be determined and initiated by the network node, such as the LS. The second positioning reference signal configuration and/or the characteristics of the second positioning reference signal transmission may comprise one or more of the following:

a. Low transmit power. The transmit power may be a transmit power per resource element for transmitting positioning reference signals. Low transmit power may herein be understood as a transmit power being lower than the transmit power of the first positioning reference signal configuration, such as lower than the transmit power of 1a.

b. Multiple (many) narrow beams. Narrow beams shall herein be understood as beams having a beam width narrower than a beam width of the first positioning reference signal configuration, such as being narrower than the beams described in 1b above. Multiple or many beams may herein be understood as the number of beams being higher than the number of beams used in the first positioning reference signal configuration, such as being higher than the number of beams described in 1b above. Positioning reference signal transmission using a beam is occupying a resource and this resource may be identified based on an ID. Hence, second positioning reference signal configuration may have a higher number of resource IDs than the number of resource IDs described in 1b.

c. Large resource allocation (such as wider bandwidth). A large resource allocation may herein be understood as the resource allocation being larger than the resource allocation for the first positioning reference signal configuration, such as being larger than the resource allocation in 1c. The larger resource allocation may for example be a wider bandwidth than the bandwidth of the first positioning reference signal configuration, such as being wider than the bandwidth of 1c. The resource allocation of the second positioning reference signal configuration may be a separate allocation (in frequency and/or time) or may overlap with the resource allocation of 1c above.

d. Periodicity (such as a frequent periodicity). The periodicity of the second positioning reference signal configuration may for example be more frequent than the periodicity of the first positioning reference signal configuration. The second positioning reference signal configuration may for example indicate that positioning reference signals are to be transmitted in a burst within a certain duration, such as transmitting positioning reference signals with for example Y ms periodicity for a duration of for example Z sec.

3) The WD may receive the above configuration(s), or at least parts of the above configurations, such as the resource allocation, and the transmit power of the above configurations. Based on the received configurations the WD may perform the two-step positioning.

a. The network node for supporting positioning of the WD, such as the LS, may be informed about which positioning step out of the two-step positioning that a WD in the wireless communications network is currently performing by the following possible options (and/or by a combination of the following options):

i. Explicitly indicated to the network node by the WD, for example by indicating, such as signaling, to the network node that the WD uses the reference signals relating to the first positioning reference signal configuration as described in point 1) or to the second positioning reference signal configuration as described in point 2) above.

ii. Implicitly indicated to the network node by the WD, such as by means of a legacy Quality Report. A low quality report may indicate that the WD is in a first, such as a coarse, positioning step and a high quality report may indicate that the WD is in a second, such as in a fine, positioning step.

b. The WD operation is that the WD starts with participating in a first positioning measurement, such as a coarse positioning measurement utilizing reference points as described in step 1, such as reference points having the first positioning reference signal configuration. When the positioning measurement is performed in DL, the WD may measure on transmitted reference signals using the first positioning reference signal configuration. The positioning measurement can be in a form of received signal strength, such as Reference Signal Received Strength (RSRP), and/or a time difference of the received reference signal, such as a Reference Signal Time Difference (RSTD) measurement. In order to reach the accuracy necessary for commercial requirements, the WD may then participate in a second positioning measurement, such as in a fine positioning measurement, based on the positioning reference signal configuration according to step 2 above, as illustrated in FIG. 2.

4) Once the network node, such as the LS, has obtained or estimated (in case of a network based positioning method, such as UL positioning) a first estimated position, such as the coarse position, of the WD (based on the first positioning step), the network node may identify, configure and/or activate one or more selected reference points to be used in the second positioning step. The one or more selected reference points may be a subset of the reference points for assisting the WD in the second positioning step as described in step 2 above. In other words, the one or more selected reference points may be a subset of the reference points having the second positioning reference signal configuration. The one or more selected reference points may be selected based on the first estimated position, for example by selecting reference points surrounding the first estimated positioning of the WD. The network node, such as the LS, may send control signaling to the selected reference points, comprising an indication that the reference points are to be activated. The selected reference points being activated may mean that the second positioning reference signal configuration is to be activated and start transmitting reference signals. The control signaling may for example comprise a flag indicating that the reference points are to be activated. In some embodiments, the reference points may activate a second positioning reference signal configuration provided to the reference point at an initial setup or configuration. The second positioning reference signal configuration may however also be signaled to the selected reference points upon activation of the selected reference points. Furthermore, the network node, such as the LS, may also provide a resource pattern configuration to each of the selected reference points to be used during the second positioning measurement. The resource pattern configuration may comprise one or more of:

a. A resource pattern, such as a downlink resource pattern, for carrying positioning reference signals, such as PRS. The resource pattern may indicate the resources of the reference point that are to be used for carrying positioning reference signals. The resource pattern may in some embodiments indicate resources of the reference points not to be used for transmitting positioning reference signals. Hence, the resource pattern may also be referred to as a positioning reference signal muting pattern, such as a PRS muting pattern.

b. A power level for each resource pattern, such as a downlink power level for each resource pattern.

The configuration transmitted to the selected reference points is described further in relation to FIG. 3. FIG. 3 illustrates the resource pattern of a selected reference point for transmitting positioning reference signals in accordance with step 4a and 4b. The positioning reference signal resource may be represented with a resource ID. The resource ID in this context may represent time and frequency resources within a beam and/or a beam direction. Based on the indicated resource ID the associated beam of that resource may be determined, the resource ID may therefore also be referred to as a beam ID. A radio network node, such as a base station, may be configured with multiple resource sets. The positioning reference signal resource may comprise multiple resource elements in time and/ or frequency to be used for the positioning measurement (such as for RSTD, RSRP). The reference point may for example be one or more of the reference points 5, 6, 8 or 9 used for the second positioning measurement, as shown in FIG. 2. However, for this example reference point 5 in FIG. 2 is considered. The selected reference point 5 is serving a WD as shown in FIG. 2. In a legacy procedure the reference point may transmit in eight reference signal resources uniformly. The eight resources are in FIG. 3 indicated with resource IDs #0-7. In other words, the reference point may use all available resources #0-7 to transmit positioning reference signals in eight different directions. The usage of the positioning reference signal resources in the legacy procedure is shown in FIG. 3(A). In FIG. 3(B), a resource pattern for transmitting positioning reference signals, in accordance with step 4a above, is shown. The resource pattern for transmitting positioning reference signals may also be referred to as a positioning reference signal muting pattern is shown. In this example the reference point 5 only transmits positioning reference signals, such as PRS, in resource IDs #2, #3, #4, which are directed towards the WD in FIG. 2. The resources not directed towards the WD, such as the resources #0, #1, #5, #6, #7 in the example scenario shown in FIG. 2, are muted. The resources being muted may herein be understood as no reference signals being transmitted in these resources. By only transmitting positioning reference signals in the resources directed towards the WD, a high positioning accuracy for the WD may be achieved while reducing the interference experienced by other reference points or WDs in the dense network. FIG. 3(C) shows an example scenario where each positioning reference signal resource has its own power level, in accordance with step 4b above. Each resource may be related to a transmit beam of a reference point. For example, the resources with IDs #3, #4 may have a higher transmit power than the power level of the resources with IDs #0, #1, #2, respectively. The transmit power may be highest in the resources directed towards the WD, such as towards the first estimated position of the WD. In the example scenario shown in FIG. 2, this would be the resources with IDs #3, #4. The transmission power level may then decrease the further away from the position of the WD the resources are directed. By setting the transmission power of a resource or a beam to zero, that resource or beam can be muted, such that no positioning reference signals are transmitted on that resource or beam. Hence, a muting pattern may be indicated based on the transmission power levels. For the example scenario shown in FIG. 2 this would mean that the resources with IDs #2 and #5 of reference point 5 transmit with a lower power level than the resources with IDs #3, #4, but with a higher power level than the resources with IDs #0, #1, #6 and #7. The resources with IDs #1 and #6 transmit with a lower power level than the resources with IDs #2 #3, #4 and #5, but with a higher power level than the resources with IDs #0 and #7. The resources with IDs #0 and #7 are directed in the opposite direction of the first estimated position and thus transmit with the lowest power level. By transmitting positioning reference signals with a high transmit power in resources directed towards the WD and transmitting positioning reference signals with a lower transmit power in resources not directed towards the WD a high positioning accuracy for the WD may be achieved while reducing the interference experienced by other reference points or WDs in the dense network. Positioning reference signal muting and/or positioning reference signal power reduction during fine measurements reduces interference levels since the muting and/or power reduction may be coordinated between a plurality of reference points. Thereby, a use of a denser positioning reference signal using comb structure may be enabled, such as more positioning reference signal resource elements per time and frequency unit, without sacrificing performance in the wireless communications network due to interference. Denser positioning reference signal may be enabled by reducing the comb factor. A default comb factor may be N=6 so that the positioning reference signal from a TRP may be placed in every $6^{th}$ sub-carrier in each Physical Resource Block (PRB) of a positioning reference signal transmission. Dense positioning reference signal may be for example N=3 so that a positioning reference signal from a TRP is placed in every $3^{rd}$ sub-carrier in each PRB of a positioning reference signals transmission.

5) The operation of step 4) may also be performed on an on-demand basis using downlink based or uplink-based positioning. The difference between on-demand operation, which may also be referred to as Aperiodic operation, and a periodic operation can be described for example in one or more of the following ways:

a. Periodic operation: The WD receives the positioning reference signal configuration (scheduling, resources, duration, etc.) of the resources intended for the second positioning measurement, such as for the fine positioning. This signaling of the positioning reference signal configuration may be performed once (such as during initial configuration for positioning, such as when the WD initially receives Long Term Evolution Positioning Protocol (LPP) assistance date from the network node, such as the LS). Unlike the legacy solution where all reference points (radio network nodes, such as gNBs and/or TRPs) just transmit positioning reference signals in the allocated positioning reference signals resources, such as in PRS resources, in solution proposed herein, only the selected reference points transmit reference signals using the second positioning reference signal configuration intended for the second positioning measurement (as described in point 4 above). Then, the WD may monitor and process the allocated positioning reference signal resources from those selected reference points.

b. On-demand/Aperiodic operation: Unlike step 5a) above where the WD has been configured once on the possible positioning reference signal resources for the second positioning measurement, such as for fine positioning, during On-demand operation, the LS or a serving radio network node, such as a serving base-station, may send a dedicated signaling to the WD on newly allocated positioning reference signal resources. The newly allocated positioning reference signal resources may be determined based on a first estimated position of the WD determined based on the first positioning measurement in step 1 above. This is typically intended for some WDs which require accurate positioning. The signaling of the newly allocated positioning reference signal resources may be signaled to the WD together with a fine positioning measurement request to the WD.

Figure 4B:
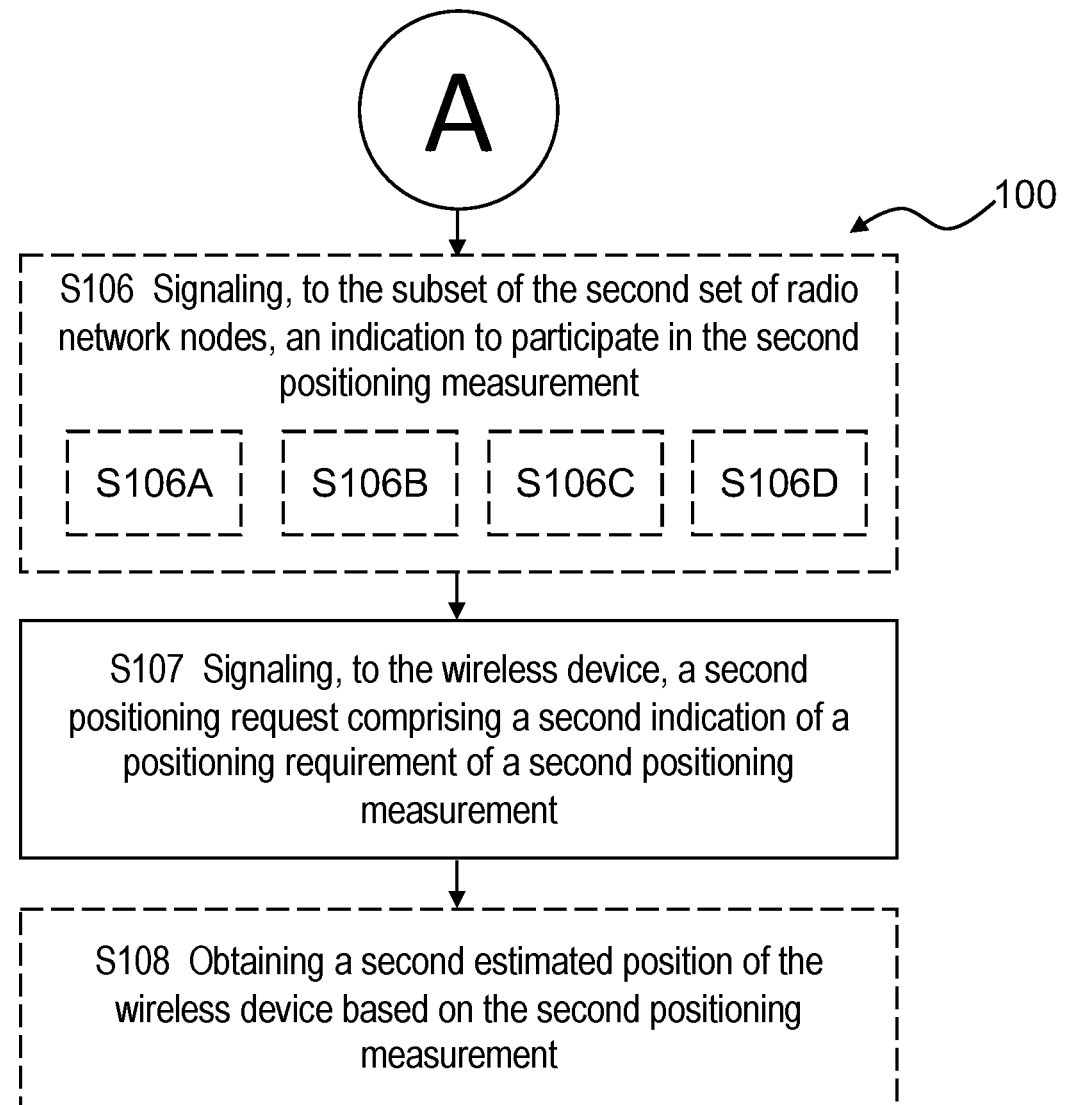

FIGS. 4A-B show a flow diagram of an example method 100, performed by a network node (such as a network node disclosed herein, such as the network node 600 of FIG. 1A, the network node of FIG. 2 and the network node 600 of FIG. 5), for supporting positioning of the wireless device, according to the disclosure. The network node may be a network node handling positioning of the wireless device. The network node may also be referred to as a location server (LS). In some embodiments the network node may be located in a core network and may thus be referred to as a core network node. The wireless communications network comprises a first set of radio network nodes having a first positioning reference signal configuration and a second set of radio network nodes having a second positioning reference signal configuration. The first positioning reference signal configuration provides a different positioning requirement than the second reference signal configuration. The positioning requirement may for example be a positioning accuracy of the wireless device, such as a horizontal/vertical positioning accuracy, and/or a positioning latency, such as a latency for obtaining the positioning estimation. In some embodiments, the first and the second set of radio network nodes may overlap, so that a single radio network node may have a plurality of positioning reference signal configurations, such as the first positioning reference signal configuration and the second positioning reference signal configuration. However, only one positioning reference signal configurations is active at once. In other words, two or more of the plurality of positioning reference signal configurations are not active at the same time.

The method 100 comprises signaling S103, to the wireless device, a first positioning request comprising a first indication of a positioning requirement of a first positioning measurement. The method 100 comprises obtaining S104 a first estimated position of the wireless device, based on a first positioning measurement for the wireless device. The first positioning measurement is associated with the first set of radio network nodes. For example, signaling S103, to the wireless device, the first positioning request comprises transmitting, to the wireless device, control signaling indicative of the first positioning request.

The method further comprises signaling S106, to the subset of the second set of radio network nodes, an indication to participate in the second positioning measurement. The subset of the second set of radio network nodes, as mentioned herein, may herein refer to the radio network nodes comprised in the subset of the second set of radio network nodes. The subset of the second set of radio network nodes may be associated with a geographical area of the first estimated position. For example, signaling S106, to the subset of the second set of radio network nodes, such as to the radio network nodes comprised in the subset of the second set of radio network nodes, the indication to participate in the second positioning measurement comprises transmitting, to the subset of the second set of radio network nodes, control signaling indicative of the indication to participate in the second positioning measurement. The indication to participate in the second positioning measurement may comprise an indication of the duration of the participation, such as a certain time that the subset of the second set of radio network nodes are to transmit positioning reference signals. The indication of duration may e.g. indicate a one-time positioning reference signal transmission, multiple positioning reference signal transmissions, or an indication that the subset of the second set of radio network nodes is to transmit positioning reference signals with a certain after receiving a signal, such as an indication, to activate the transmission of positioning reference signals and to stop transmitting positioning reference signals after receiving a signal, such as an indication, to de-activate, such as stop, transmission of the positioning reference signals.

The method 100 comprises signaling S107, to the wireless device, a second positioning request comprising a second indication of a positioning requirement of a second positioning measurement. The second indication of the positioning requirement of the second positioning measurement indicates a different positioning requirement than the first indication of the positioning requirement. For example, signaling S107, to the wireless device, the second positioning request comprises transmitting, to the wireless device, control signaling indicative of the second positioning request.

The first estimated position may be obtained by receiving a measurement report indicative of a first position of the WD from a measuring device. The measuring device may be any device participating in the positioning procedure, such as a radio network node or the wireless device and performing measurements for positioning the wireless device. The measurements may for example be performed on reference signals transmitted by a device configured to transmit reference signals during the positioning procedure. If the positioning procedure is performed in UL the measuring device from which the measurement results are obtained may be the radio network node, and the device transmitting the reference signals may be the wireless device. If the positioning procedure is performed in DL the measuring device from which the measurement results are obtained may be the wireless device, and the device transmitting the reference signals may be the radio network node. The obtaining of the first position of the wireless device may be initiated by the network node. The signaling to the radio network node may be sent over a New Radio Positioning Protocol A (NRPPa). The signaling to the WD may be sent over a LPP.

Based on the first positioning estimation the network node may activate selected radio network nodes, such as gNBs or TRPs, and/or corresponding beams, indicated by a resource or resource pattern, for performing the second positioning measurement. Furthermore, the radio network nodes that are to participate in the second positioning measurement may be limited based on the first estimated position obtained for the wireless device in the first positioning measurement. The beams for each of the involved radio network nodes, may be determined as a subset of all beams available to the radio network node based on the information gathered from the first positioning measurement. Hence, the resources to be used for the second positioning measurement may be associated with the result of the first positioning measurement, such as with the first estimated position.

The positioning measurements mentioned herein, such as the first and/or the second positioning measurement may be timing measurements, such as Reference Signal Time Difference (RSTD), power measurements, such as Reference Signal Received Power (RSRP) and/or positioning estimation of the actual coordinate of the wireless device. The estimated position of the WD may be indicated as a geographical position or may be indicated based on the resources, such as based on the resource ID, used for performing the positioning measurement. In other words, the network node may receive a measurement report indicating for example a highest RSRP and a corresponding resource ID information. The highest RSRP and the corresponding resource ID information implicitly indicates a position of the wireless device in relation to a radio network node corresponding to the resource ID. Based on the received resource ID information, the network node may determine, based for example on a received resource configuration of the radio network node, a set of resources corresponding to the received resource ID which can be used for the second positioning procedure. Hence, the estimated position based on the first positioning procedure may be an explicit geographical position, estimated based on the measurement report, or an implicit position in relation to one or more radio network nodes indicated by the measurement report.

The method 100 may further comprise obtaining S101 the positioning reference signal configuration of the first and second set of radio network nodes. The positioning reference signal configurations may be obtained by receiving the positioning reference signal configuration from the respective radio network nodes of the first and second set of radio network nodes. The positioning reference signal configurations may be received at a same or at separate occasions.

The method 100 may further comprise signaling S102, to the wireless device, the first and the second reference signal configurations of the first and second set of radio network nodes. The signaling may comprise an indication of the positioning requirement of the first and the second reference signal configurations. The reference signal configurations of the first and the second set of radio network nodes may be signaled to the wireless device at a same or at separate occasions. In some embodiments the second positioning reference signal configuration may be signaled after the network node has obtained the coarse position of the WD in order to identify and configure the second set of radio network nodes. The reference signal configurations of the first and the second set of radio network nodes may be signaled in an information element relating to a set of radio network nodes over NRPP and/or LPP.

The positioning reference signal configuration may comprise a resource configuration, such as a beam configuration, for carrying reference signals during the positioning measurement. The resource configuration, such as the beam configuration of the second positioning reference signal configuration may be different than a resource configuration, such as a beam configuration, of the first positioning reference signal configuration, as disclosed in 2a-2d above. In one or more example embodiments the beam configuration of the second positioning reference signal configuration may comprise a higher number of beams and/or narrower beams than the beam configuration of the first reference signal configuration. The resources may be indicated using a resource ID, which may indicate a beam ID of a transmit beam for transmitting reference signals, such as PRSs in DL or SRS in UL, during the positioning measurement. The resources may indicate one or more network nodes and/or transmit beams for transmitting reference signals for the first and second positioning measurements respectively. The resources may also be indicated using a resource set ID. The resources may thus be indicated by one or more resource IDs, wherein each of the one or more resource IDs may be indicative of one beam or one cell of a radio network node, such as a base station. Hence, the second positioning reference signal configuration may comprise a higher number of resources IDs that can be used for transmission of positioning reference signals than the first positioning reference signal configuration.

The positioning reference signal configuration may comprise a transmission power per resource element for transmitting positioning reference signals. In one or more example embodiments, the transmission power per resource element of the second positioning reference signal configuration may be lower than a transmission power per resource element of the first positioning reference signal configuration.

The positioning reference signal configuration comprises a resource allocation in time and/or in frequency for transmitting positioning reference signals. In one or more example embodiments, the resource allocation of the second positioning reference signal configuration may have a larger bandwidth and/or a larger time span than the resource allocation of the first positioning reference signal configuration.

The positioning reference signal configurations may indicate a periodicity for transmitting reference signals. In one or more example embodiments the periodicity of the second positioning reference signal configuration may be more frequent than the periodicity of the first positioning reference signal configuration. By increasing the periodicity of the reference signal transmission, reference signals are transmitted more frequently, and thereby the positioning estimates may be obtained faster. Thus, a latency of the positioning measurement may be improved.

The method may further comprise determining S105, based on the first estimated position of the wireless device, a subset of the second set of radio network nodes that is to participate in a second positioning measurement for the wireless device. The subset of the second set of radio network nodes may be associated with a geographical area of the first estimated position. Being associated with a geographical area herein means that the radio network nodes provide coverage over the geographical area. A radio network node may for example be associated with the geographical area when the radio network node has a cell and/or a beam providing coverage over the geographical area.

In one or more example embodiments, signaling S106 the indication to participate in the second positioning measurement may comprise transmitting S106A an indication to activate transmission of reference signals using the second reference signal configuration. In one or more example embodiments, signaling S106 the indication to participate in the second positioning measurement may comprise transmitting S106B, to the subset of the second set of radio network nodes, control signaling indicative of active resources for transmitting reference signals for positioning to be used for the second positioning measurement, wherein the active resources are a subset of the resources available to the subset of the second set of radio network nodes. The resources may comprise beams, such as transmit beams or receive beams, of the radio network nodes, and/or resources in time and frequency. The subset of the available resources that are not active may be referred to as inactive resources, wherein the inactive resources are not used for transmitting positioning reference signals. The inactive resources may also be referred to as muted resources. By muting a subset of the available resources, such as a subset of beams, interference that would otherwise be caused by transmission on these resources may be eliminated or at least reduced. The signaling S106 may thus in some embodiments comprise signaling a resource pattern for transmitting positioning reference signals or a reference signal muting pattern, as described with regards to FIG. 3B. The resources available to the subset of the second set of radio network nodes may thus be resources which are available to the radio network node and/or the WD for transmitting and/or receiving positioning reference signals. The resources available to the subset of the second set of radio network nodes may comprise resources configured in time and frequency. The resources available to the subset of the second set of radio network nodes may comprise beams of the radio network node and/or the WD, which are available to the radio network node and/or the WD for transmitting and/or receiving positioning reference signals. The active resources may thus be a subset of the available resources, and/or beams of the radio network node and/or the WD. An indication of the set of resources may be sent to the radio network node over the NRPPa, and to the wireless device via the LPP.

In one or more example embodiments, signaling S106 an indication to participate in the second positioning measurement may comprise transmitting S106C, to the subset of the second set of radio network nodes, control signaling indicative of a power level of each resource for transmitting reference signals for positioning, to be used for the second positioning measurement. In one or more example embodiments, positioning reference signals may be transmitted with different power levels in different resources. In some example embodiments, the active resources for transmitting positioning reference signals may have different power levels for transmitting positioning reference signals. For example, resources, such as beams, directed directly towards a receiving entity, such as the WD and/or the radio network node, may transmit with a high power level, while resources that are not directed directly towards, such as in direct line of sight, the receiving entity may be configured to transmit with a lower power level. By reducing the power level on resources not directed directly towards the receiving entity, interference in the wireless communications network may be reduced. In some embodiments, the reference signal muting pattern, as described in relation to FIGS. 3(B) and 3(C), may be indicated by indicating that a power level of one or more resources to be muted is zero.

In one or more example embodiments, signaling S106 an indication to participate in the second positioning measurement may comprise transmitting S106D, to the subset of the second set of radio network nodes, control signaling indicative of a duration of the participation in the second positioning measurement. The indication of the duration of the participation may in some embodiments indicate a certain time that the subset of the second set of radio network nodes are to transmit positioning reference signals. The indication of duration may in some embodiments indicate a one-time positioning reference signal transmission, multiple positioning reference signal transmissions, or may indicate that the subset of the second set of radio network nodes is to perform continuous transmission of positioning reference signals after receiving an "activation" signal, such as an indication to start transmitting positioning reference signals, and to stop transmitting PRS after receiving a "de-activation" signal, such as an indication to start transmitting positioning reference signals.

The method may further comprise obtaining S108 a second estimated position of the wireless device based on the second positioning measurement. The second estimated position may have a higher accuracy, such as a higher positioning accuracy, than the first estimated position. The obtaining S108 of the second position may comprise receiving, from a measuring device, a measurement report indicative of the second positioning measurement based on the second positioning reference signal configuration. The obtaining S108 may further comprise determining an updated position of the wireless device based on the measurement report from the second positioning measurement. The measuring device may be the radio network node during UL positioning measurements and/or the WD during DL positioning measurements. The measurement report may comprise an indication of the positioning step performed by the measuring device, such as an indication indicating whether the positioning measurement is the first or the second step of the two step positioning, such as whether the positioning measurement is a coarse or a fine positioning measurement. This may be implicitly or explicitly indicated as described in 3a above. The second estimated position may be more precise, which may also be referred to as more accurate, than the first estimated position determined based on the first positioning measurement.

Figure 5A:
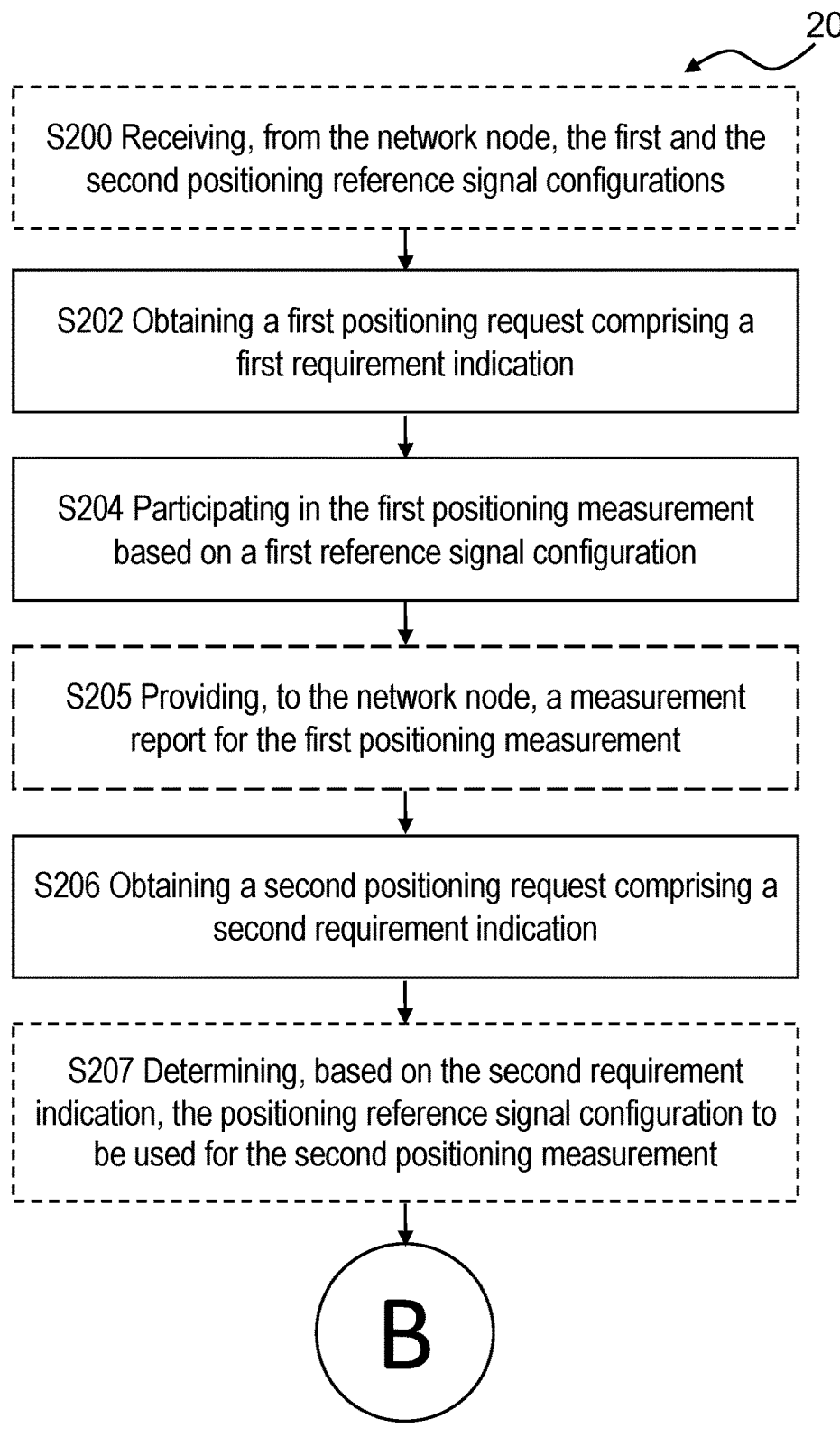
FIGS. 5A-5B is a flow-chart illustrating an example method, performed in a wireless device of a wireless communication system, for supporting positioning of the wireless device according to this disclosure.
Figure 5B:
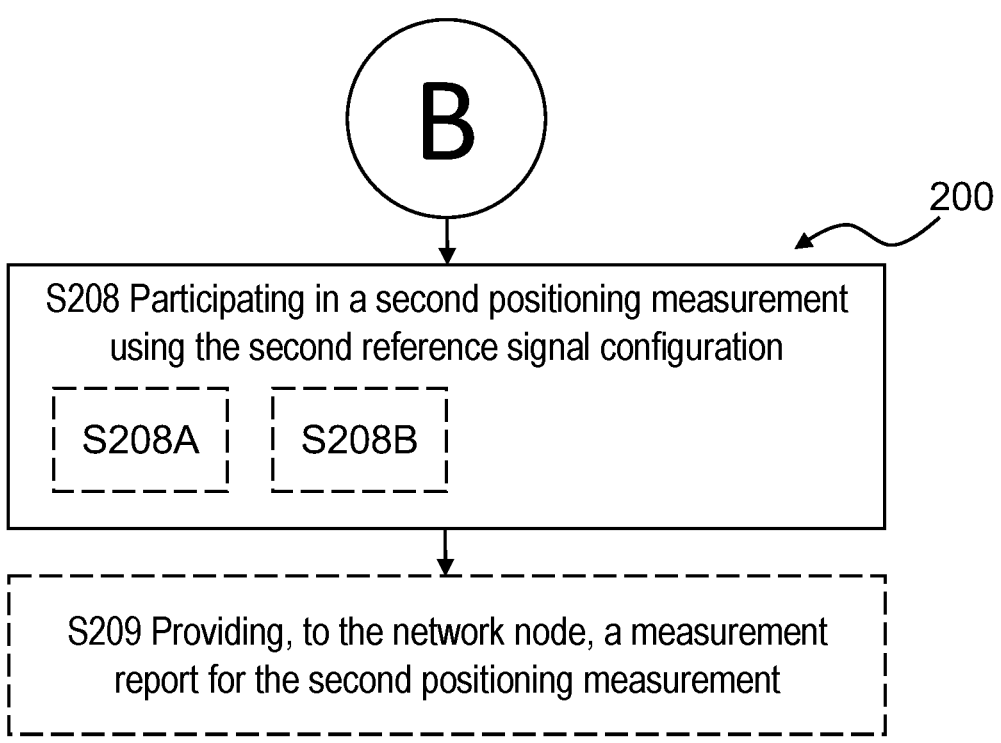
Figure 8:
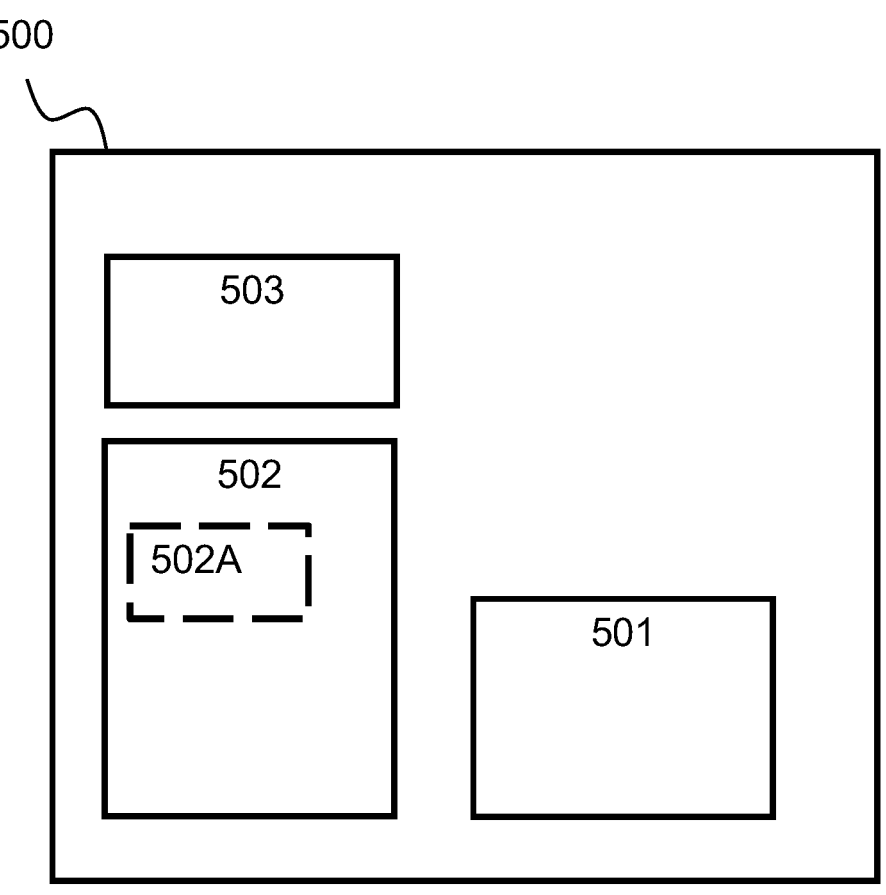
FIG. 8 is a block diagram illustrating an example wireless device according to this disclosure.

FIGS. 5A-B show a flow diagram of an example method 200, performed by a wireless device (such as a wireless device disclosed herein, such as wireless device 500 of FIG. 1, the wireless device of FIG. 2 and the wireless device 500 of FIG. 8), for supporting positioning of the wireless device according to the disclosure. The wireless communications network comprises a first set of radio network nodes having a first positioning reference signal configuration and a second set of radio network nodes having a second positioning reference signal configuration. The first reference signal configuration provides a different positioning requirement than the second reference signal configuration. The method 200 comprises obtaining S202 a first positioning request comprising a first requirement indication. The first requirement indication indicates a positioning requirement of a first positioning measurement. The positioning requirement may be a required positioning accuracy or a desired latency of the positioning measurement. The step of obtaining S202 the first positioning request corresponds to the step of signaling S103 of the network node (such as the LS) as described in relation to FIG. 4A. The method 200 comprises participating S204 in the first positioning measurement based on a first reference signal configuration. The first reference signal configuration is determined based on the first requirement indication. The method 200 comprises obtaining S206 a second positioning request comprising a second requirement indication. The second requirement indication indicates a positioning requirement of a second positioning measurement. The second requirement indication indicates a different positioning requirement than the first requirement indication. The step of obtaining S206 the second positioning request corresponds to the step of signaling S107 of the network node (such as the LS) as described in relation to FIG. 4B. The requirement indication may for example indicate a required accuracy or latency of the positioning measurement. The indication may for example also indicate a latency requirement of each positioning reference signal configuration, such as whether the first and the second positioning reference signal configurations supports high or low latency positioning.

The method 200 comprises participating S208 in a second positioning measurement using the second reference signal configuration, wherein the second reference signal configuration is determined based on the second requirement indication. The positioning measurement may be performed in DL or in UL.

When the positioning measurement is performed in DL, participating S208 in the second positioning measurement may comprise measuring S208A on reference signals received, such as PRSs, using the second positioning reference signal configuration. When the positioning measurement is performed in UL, participating S208 in the second positioning measurement may comprise transmitting S208B reference signals, such as SRSs, using the second reference signal configuration.

The method 200 may comprise receiving S200, from the network node, the first and the second positioning reference signal configurations of the first and second set of radio network nodes comprising an indication of the positioning requirement of the first and the second reference signal configurations. The positioning requirement indication may for example indicate that the first positioning reference signal configuration supports a coarse or a low accuracy positioning of the WD and that the second positioning reference signal configuration supports a fine or a high accuracy positioning of the WD. The indication may for example also indicate a latency requirement of each positioning reference signal configuration, such as whether the first and the second positioning reference signal configurations supports high or low latency positioning. The step of receiving S200 the first positioning request corresponds to the step of signaling S102 of the network node (such as the LS) as described in relation to FIG. 4A.

The method 200 may comprise providing S205, to the network node, a measurement report for the first positioning measurement. The measurement report may be indicative of a first estimated position of the WD. The measurement report may also comprise an indication as to which positioning step the positioning measurement relates to, such as to the first, a coarse or a low accuracy positioning measurement.

The method 200 may comprise determining S207, based on the second requirement indication, the positioning reference signal configuration to be used for the second positioning measurement, wherein the reference signal configuration is selected so that the second measurement satisfies the second requirement indication.

The method 200 may comprise providing S209, to the network node, a measurement report for the second positioning measurement. The measurement report may be indicative of a second estimated position of the WD. The measurement report may also comprise an indication as to which positioning step the positioning measurement relates to, such as to the second, a fine or a high accuracy positioning measurement. The providing S209 may comprise sending a measurement report indicative of the second position of the wireless device based on the second positioning measurement.

Figure 9:
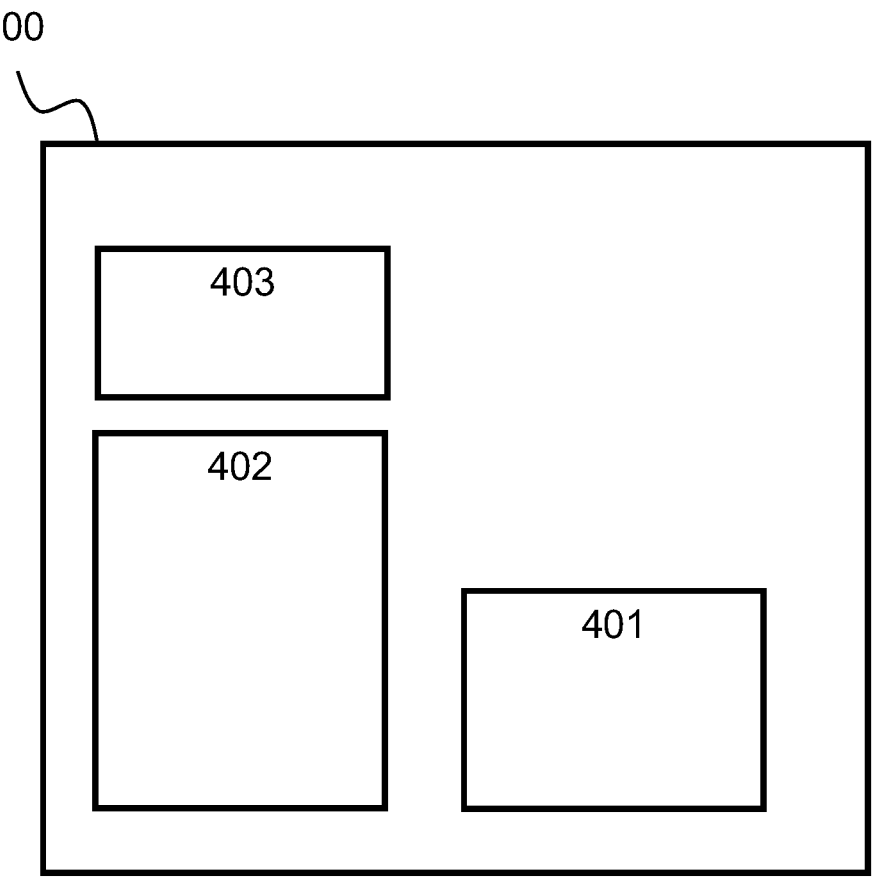
FIG. 9 is a block diagram illustrating an example radio network node according to this disclosure.

FIG. 6 shows a flow diagram of an example method 300, performed by a radio network node (such as a radio network node disclosed herein, such as radio network node 400 of FIG. 1, the radio network node of FIG. 2 and the radio network node 400 of FIG. 9), for supporting positioning of the wireless device according to the disclosure. The radio network node may for example be a radio network node comprised in the second set of radio network nodes and/or reference points described herein. The method 300 comprises receiving S301, from the network node (such as the LS), an indication to participate in a positioning measurement for the wireless device. The receiving S301 corresponds to the signaling S106 of the network node (such as the LS) as described in relation to FIG. 4B. The method 300 comprises participating S303 in the positioning measurement for the wireless device based on the reference signal configuration for positioning. In one or more example embodiments, the reference signal configuration may initially be inactive. Initially being inactive herein means that the radio network node is initially not transmitting reference signals based on the reference signal configuration. The indication to participate in the positioning measurement may indicate that the positioning reference signal configuration is to be activated. That the positioning reference signal is to be activated herein means that the radio network node is to start transmitting positioning reference signals based on the positioning reference signal configuration. In one or more example embodiments, the radio network node may have a plurality of positioning reference signal configurations.

The method 300 may further comprise activating S302 the transmission of positioning reference signals using the reference signal configuration. This may for example be the case when a transmission of positioning reference signals is initially inactivated. In this case, the radio network node may activate the transmission of positioning reference signals using the reference signal configuration, such as using the second reference signal configuration.

When the positioning measurement is performed in DL, participating S303 in the positioning measurement may comprise transmitting S303A reference signals, such as PRS, based on the positioning reference signal configuration.

When the positioning measurement is performed in UL, participating S303 in the positioning measurement may comprise measuring S303B on reference signals received from the wireless device based on the positioning reference signal configuration.

The method may further comprise sending S304, to the network node, a measurement report indicative of the positioning measurement for the wireless device. The measurement report may be indicative of an estimated position, such as a first or a second estimated position, of the WD. The measurement report may also comprise an indication as to which positioning step the positioning measurement relates to, such as to the first, a coarse or a low accuracy positioning measurement.

In one or more example embodiments, the radio network node may have or may define a plurality of positioning reference signal configurations. Each positioning reference signal configuration out of the plurality of positioning reference signal configurations may correspond to a certain positioning requirement, such as an accuracy requirement and/or a latency requirement. The indication to participate in the positioning measurement for the wireless device may comprise an indication of a positioning requirement for the positioning measurement. In the one or more example embodiments where the radio network node has a plurality of positioning reference signal configurations, participating S303 in the positioning measurement for the wireless device based on the reference signal configuration for positioning may comprise selecting S303C the reference signal configuration out of the plurality of reference signal configurations to be used for the positioning measurement based on the indication of the positioning requirement.

In one or more example embodiments, receiving S301 the indication to participate in the positioning measurement may comprise receiving S301A control signaling indicative of active resources for transmitting reference signals for positioning to be used for the second positioning measurement. The active resources may be a subset of the resources available to the radio network node. This corresponds to the resource pattern and/or positioning reference resource muting pattern as described in step 4. The indication to participate in the positioning measurement may further comprise an indication of duration of the positioning reference signal transmission. The duration of the positioning reference signal transmission may herein be understood as how long the participating radio network nodes are to transmit positioning reference signals. The indication of the duration may in some embodiments indicate that the radio network node is to transmit positioning reference signals one time. The indication of the duration may in some embodiments that the radio network node is to perform multiple positioning reference signal transmissions (such as performing X transmissions with a predetermined periodicity). The indication of the duration may in some embodiments indicate that the radio network node is to transmit positioning reference signals continuously after receiving an "activation"-signaling, such as an indication to start transmitting positioning reference signals, and is to stop transmitting after receiving a "de-activation"-signaling, such as an indication to start transmitting positioning reference signals.

In one or more example embodiments, receiving S301 the indication to participate in the positioning measurement may comprise receiving S301B control signaling indicative of a power level of each resource for transmitting reference signals for positioning, to be used for the positioning measurement. This corresponds to step 4b shown above.

Figure 7:
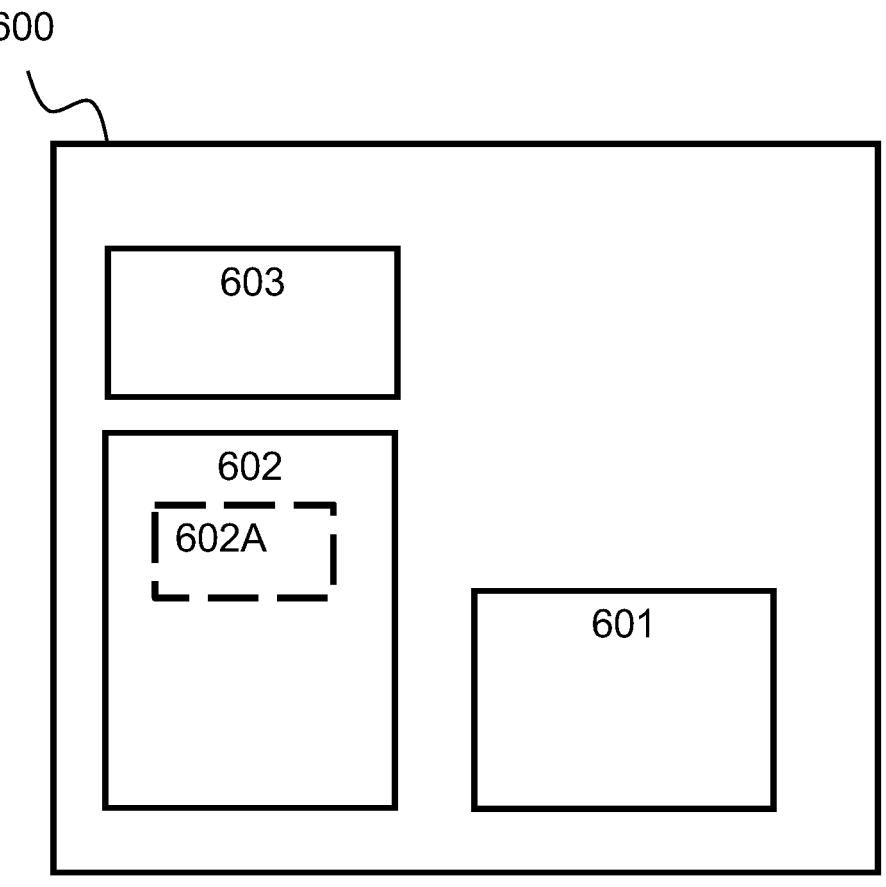
FIG. 7 is a block diagram illustrating an example network node according to this disclosure.

FIG. 7 shows a block diagram of an example network node 600 according to the disclosure. The network node 600 comprises a memory circuitry 601, a processor circuitry 602, and an interface 603. The network node 600 may be configured to perform any of the methods disclosed in FIGS. 4A-B.

The network node 600 may be a core network node, such as a location server.

The network node 600 is configured to communicate with a radio network node, such as the radio network node disclosed herein, using a communication system (a wired and/or wireless communication system). The interface 603 is configured for communications via the communication system, such as a communication system supporting positioning of the wireless device. The interface 603 may for example be configured for communications between the network node (such as the LS) and the radio network nodes. The communication system may comprise a wireless communication network to communicate with the wireless device. The wireless communications network comprises a first set of radio network nodes having a first positioning reference signal configuration and a second set of radio network nodes having a second positioning reference signal configuration. The first positioning reference signal configuration provides a different positioning requirement than the second reference signal configuration.

The network node 600 is configured to communicate to the wireless device, via a radio network node of the wireless communications network, such as the radio network node disclosed herein.

The network node 600 is configured to signal (such as via the interface 603), to the wireless device, a first positioning request comprising a first indication of a positioning requirement of a first positioning measurement, as illustrated in step S103 of FIG. 4A.

The network node 600 is configured to obtain (such as via the interface 603 or via an obtaining circuitry 602A) a first estimated position of the wireless device, based on a first positioning measurement for the wireless device, wherein the first positioning measurement is associated with the first set of radio network nodes, as illustrated in step S104 of FIG. 4A.

The network node 600 is configured to signal (such as via the interface 603), to the wireless device, a second positioning request comprising a second indication of a positioning requirement of a second positioning measurement, as illustrated in step S107 of FIG. 4B. The second indication of the positioning requirement of the second positioning measurement indicates a different positioning requirement than the first indication of the positioning requirement.

The processor circuitry 602 is optionally configured to perform any of the operations disclosed in FIGS. 4A and 4B (S101, S102, S103, S105, S106, S106A, S106B, S106C, S108). The operations of the network node 600 may be embodied in the form of executable logic routines, e.g., lines of code, software programs, etc., that are stored on a non-transitory computer readable medium, e.g., the memory circuitry 601, and are executed by the processor circuitry 602.

Furthermore, the operations of the network node 600 may be considered a method that the network node 600 is configured to carry out. Also, while the described functions and operations may be implemented in software, such functionality may as well be carried out via dedicated hardware or firmware, or some combination of hardware, firmware and/or software.

The memory circuitry 601 may be one or more of a buffer, a flash memory, a hard drive, a removable media, a volatile memory, a non-volatile memory, a random access memory (RAM), or other suitable device. In a typical arrangement, the memory circuitry 601 may include a non-volatile memory for long term data storage and a volatile memory that functions as system memory for the processor circuitry 603. The memory circuitry 601 may exchange data with the processor circuitry 602 over a data bus. Control lines and an address bus between the memory circuitry 601 and the processor circuitry 602 also may be present (not shown in FIG. 7). The memory circuitry 601 is considered a non-transitory computer readable medium.

The memory circuitry 601 may be configured to store positioning reference signal configurations, positioning measurements and information indicative thereof in a part of the memory based on the received software data.

FIG. 8 shows a block diagram of an example wireless device 500 according to the disclosure. The wireless device 500 comprises a memory circuitry 501, a processor circuitry 502, and a wireless interface 503. The wireless device 500, WD, may be configured to perform any of the methods disclosed in FIGS. 5A-5B. In other words, the wireless device 500 may be configured for supporting positioning of the wireless device, e.g. by a network node, such as a location server.

The wireless device 500 is configured to communicate with a radio network node, such as the radio network node disclosed herein, using a wireless communication network. The wireless device 500 is configured to communicate with a network node, such as the network node disclosed herein, for example via the radio network node.

The wireless communications network comprises a first set of radio network nodes having a first positioning reference signal configuration and a second set of radio network nodes having a second positioning reference signal configuration. The first reference signal configuration provides a different positioning requirement than the second reference signal configuration.

The wireless device 500 is configured to obtain (such as via the processor circuitry 502, such as via the interface 503 and/or via an obtaining circuitry 502A) a first positioning request comprising a first requirement indication, as illustrated in step S202 of FIG. 5A. The first requirement indication indicates a positioning requirement of a first positioning measurement.

The wireless device 500 is configured to participate (such as via the processor circuitry 502, such as via the interface 503) in the first positioning measurement based on a first reference signal configuration, as illustrated in step S204 of FIG. 5A. The first reference signal configuration may be determined based on the first requirement indication.

The wireless device 500 is configured to obtain (such as via the processor circuitry 502, such as via the interface 503 and/or via an obtaining circuitry 502A) a second positioning request comprising a second requirement indication, as illustrated in step S206 of FIG. 5A. The second requirement indication indicates a positioning requirement of a second positioning measurement. The second requirement indication may indicate a different positioning requirement than the first requirement indication.

The wireless device 500 is configured to participate (such as via the processor circuitry 502, such as via the interface 503) in a second positioning measurement using the second reference signal configuration, as illustrated in step S208 of FIG. 5B. The second reference signal configuration is determined based on the second requirement indication.

The wireless interface 503 is configured for wireless communications via a wireless communication system, such as a 3GPP system, such as a 3GPP system supporting New Radio, NR.

The wireless device 500 is optionally configured to perform any of the operations disclosed in FIGS. 5A and 5B (such as any one or more of S200, S205, S207, S208A, S208B, S209). The operations of the wireless device 500 may be embodied in the form of executable logic routines (e.g., lines of code, software programs, etc.) that are stored on a non-transitory computer readable medium (e.g., the memory circuitry 501) and are executed by the processor circuitry 502).

Furthermore, the operations of the wireless device 500 may be considered a method that the wireless device 500 is configured to carry out. Also, while the described functions and operations may be implemented in software, such functionality may as well be carried out via dedicated hardware or firmware, or some combination of hardware, firmware and/or software.

The memory circuitry 501 may be one or more of a buffer, a flash memory, a hard drive, a removable media, a volatile memory, a non-volatile memory, a random access memory (RAM), or other suitable device. In a typical arrangement, the memory circuitry 501 may include a non-volatile memory for long term data storage and a volatile memory that functions as system memory for the processor circuitry 502. The memory circuitry 501 may exchange data with the processor circuitry 502 over a data bus. Control lines and an address bus between the memory circuitry 501 and the processor circuitry 502 also may be present (not shown in FIG. 8). The memory circuitry 501 is considered a non-transitory computer readable medium.

FIG. 9 shows a block diagram of an example radio network node 400 according to the disclosure. The radio network node 400 comprises a memory circuitry 401, a processor circuitry 402, and an interface 403. The radio network node 400 may be configured to perform any of the methods disclosed in FIG. 6. In other words, the radio network node 400 may be configured for supporting positioning of a wireless device. The radio network node 400 has a reference signal configuration for positioning, for example stored in the memory circuitry 401. The radio network node 400 is configured to communicate with a wireless device, such as a user equipment, such as the user equipment disclosed herein, via the interface 403 using a wireless communication system.

The interface 403 is configured for wireless communications via a wireless communication system, such as a 3GPP system, such as a 3GPP system supporting New Radio, NR.

The interface 403 is configured to communicate with the network node disclosed herein (such as location server) via a wired and/or wireless communication system.

The radio network node 400 is configured to receive, such as via the interface 403, from a network node, an indication to participate in a positioning measurement for the wireless device.

The radio network node 400 is configured to participate (such as via the processor circuitry 402) in the positioning measurement for the wireless device based on the reference signal configuration for positioning.

The processor circuitry 402 is optionally configured to perform any of the operations disclosed in FIG. 6 (such as any one or more of S301A, S301B, S302, S303A, S303B, S303C, S304). The operations of the network node 400 may be embodied in the form of executable logic routines (e.g., lines of code, software programs, etc.) that are stored on a non-transitory computer readable medium (e.g., the memory circuitry 401) and are executed by the processor circuitry 402).

Furthermore, the operations of the radio network node 400 may be considered a method that the radio network node 400 is configured to carry out. Also, while the described functions and operations may be implemented in software, such functionality may as well be carried out via dedicated hardware or firmware, or some combination of hardware, firmware and/or software.

The memory circuitry 401 may be one or more of a buffer, a flash memory, a hard drive, a removable media, a volatile memory, a non-volatile memory, a random access memory (RAM), or other suitable device. In a typical arrangement, the memory circuitry 401 may include a non-volatile memory for long term data storage and a volatile memory that functions as system memory for the processor circuitry 402. The memory circuitry 401 may exchange data with the processor circuitry 402 over a data bus. Control lines and an address bus between the memory circuitry 401 and the processor circuitry 402 also may be present (not shown in FIG. 9). The memory circuitry 401 is considered a non-transitory computer readable medium.

Figure 10:
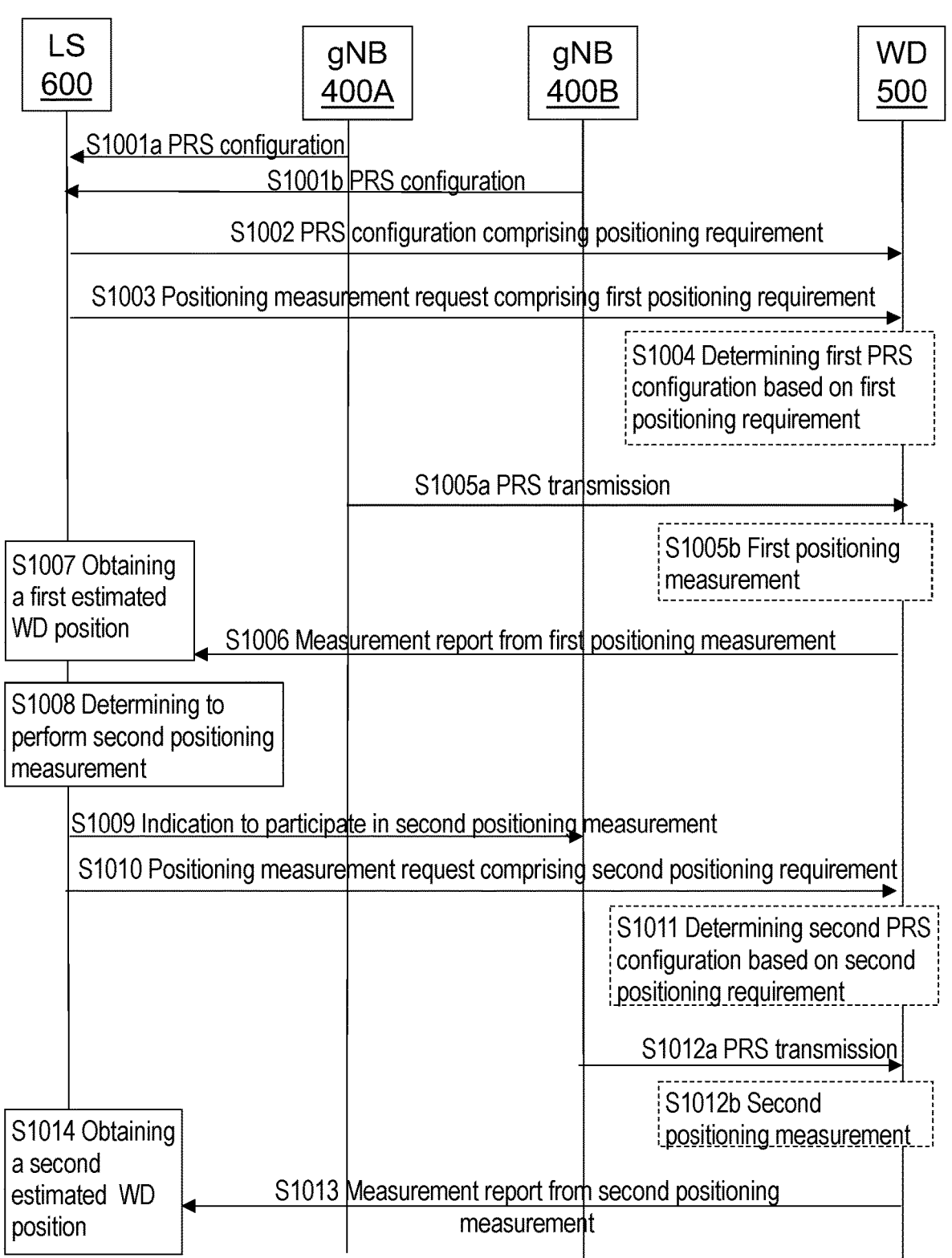
FIG. 10 is a signaling diagram illustrating an example procedure for supporting positioning of a wireless device.

FIG. 10 shows a signaling diagram illustrating an exemplary two-step method for supporting positioning of a wireless device in a wireless communications network according to the current disclosure. The wireless communications network comprises a network node, such as a LS 600, a wireless device 500 and one or more first radio network nodes, such as first gNBs 400A, which may also be referred to as a first set of radio network nodes, and one or more second radio network nodes, such as second gNBs 400B, which may also be referred to as a second set of radio network nodes. The first set of radio network nodes 400A have a first positioning reference signal configuration, such as a first PRS configuration, and a second set of radio network nodes 400B have a second positioning reference signal configuration, such as a first PRS configuration. The first positioning reference signal configuration may be associated with a different positioning requirement than the second reference signal configuration. The reference signal configuration being associated with a positioning requirement means that the positioning reference signal configuration satisfies the positioning requirement. The positioning requirement may for example be a positioning accuracy of the wireless device, such as a horizontal/vertical positioning accuracy, and/or a positioning latency, such as a latency for performing the positioning measurement. In some embodiments, the first and the second set of radio network nodes may overlap, so that a single radio network node may have a plurality of positioning reference signal configurations, such as the first positioning reference signal configuration and the second positioning reference signal configuration. Depending on the reference signal configuration that is currently active the radio network node may act as either the first radio network node 400A or the second radio network node 400B. When the first positioning reference signal configuration is active, the radio network node may act as the first radio network node 400A, when the second positioning reference signal configuration is active, the radio network node may act as the first radio network node 400B. In the exemplary method shown in FIG. 10 the positioning measurements are performed in DL, where the radio network node transmits positioning reference signals, such as PRS. The wireless device performs positioning measurements on the positioning reference signals received from the radio network nodes.

The first and the second radio network nodes 400A and 400B transmit S1001*a*, S1001*b* their one or more PRS configurations to the LS 600. These steps S1001*a*, S1001*b* correspond to the step S101 of performed in the network node and disclosed in relation to FIG. 4.

The LS 600 transmits S1002 the PRS configurations together with an indication of a positioning requirement associated with the respective PRS configurations of the first and the second radio network nodes 400A, 400B to the WD 500. The positioning requirement may be a required positioning accuracy or a required or desired latency of the PRS configuration. In other words, the indication may indicate whether the positioning reference signal configurations are associated with a coarse or a fine positioning measurement. This step corresponds to step S102 of FIG. 4A and step S200 of FIG. 5A.

The LS 600 transmits S1003 a first positioning measurement request to the WD 500. The positioning measurement request may request the WD 500 to perform a positioning measurement, such as a first positioning measurement. The positioning measurement request may comprise a first positioning requirement for the positioning measurement. The positioning requirement may for example indicate a required positioning accuracy for the positioning measurement. In the example method shown in FIG. 10, the positioning requirement may indicate that the WD is to perform the positioning measurement using the first positioning reference signal configuration, which may indicate a coarse positioning measurement. This step S1003 corresponds to the step S103 of FIG. 4A and step S202 of FIG. 5A.

The WD 500 may determine S1004, based on the positioning requirement received in the positioning request, a PRS configuration to use for the positioning measurement. The WD 500 may determine to use a positioning reference signal configuration satisfying the positioning requirement received in the positioning measurement request. This step S1004 is similar to the step S204 of FIG. 5A.

The first gNB 400A transmits S1005*a* PRS using the first PRS configuration. The first gNB 400A may be configured, based on the first PRS configuration, to periodically transmit PRS.

The WD 500 performs S1005*b* a first positioning measurement on PRS received from the first gNB 400A using the determined positioning reference signal configuration satisfying the positioning requirement. This step S1005*a* is similar to step S204 of FIG. 5A.

The WD 500 transmits S1006 a measurement report of the first positioning measurement to the LS 600. The measurement report may be indicative of a first estimated position of the WD. This step S1006 is similar to the step S205 of FIG. 5A.

The LS 600 obtains S1007 a first estimated position of the WD 500 based on the measurement report received from the WD 500. This step corresponds to step S104 of FIG. 4A.

Based on the first estimated position of the WD 500, the LS 600 may determine S1008 that a second positioning measurement having a different positioning requirement, such as a positioning measurement having a higher accuracy, is required. The determining S1008 may comprise determining a subset of second gNBs 400B to participate in the second positioning measurement.

The LS 600 signals S1009 an indication to participate in the second positioning measurement to the subset of the second gNBs 400B. The indication to participate may comprise an indication indicating that the gNBs 400B are to activate transmission of reference signals using the second reference signal configuration. The indication to participate in the second positioning measurement may further comprise control signaling indicative of active resources for transmitting reference signals for positioning to be used for the second positioning measurement, and/or control signaling indicative of a power level of each resource for transmitting reference signals for positioning. The indication to participate in the second positioning measurement may also comprise an indication of the duration of the participation, such as a certain time that the second gNBs are to transmit PRS. The indication of duration may for example indicate a one-time positioning reference signal transmission, multiple positioning reference signal transmissions, or an indication that the second gNB is to perform continuous transmission of PRS after receiving an "activation"-signal and to stop transmitting PRS after receiving a "de-activation"-signal. This step is similar to steps S106, S106A, S106B, S106C, S106D of FIG. 4B and step S301, S301A and S301B of FIG. 6.

The LS 600 transmits S1010 a second positioning measurement request to the WD 500. The positioning measurement request may request the WD 500 to perform a positioning measurement, such as a second positioning measurement. The second positioning measurement request may comprise a second positioning requirement for the second positioning measurement. The positioning requirement may for example indicate a required positioning accuracy for the positioning measurement. In the example method shown in FIG. 10, the positioning requirement may indicate that the WD is to perform the second positioning measurement using the second positioning reference signal configuration, which may indicate a fine positioning measurement. This step S1010 corresponds to the step S107 of FIG. 4B and step S206 of FIG. 5A.

The WD 500 may determine S1011, based on the second positioning requirement received in the second positioning request, a PRS configuration to use for the second positioning measurement. The WD 500 may determine to use a second positioning reference signal configuration satisfying the second positioning requirement received in the second positioning measurement request. This step S1004 corresponds to the step S207 of FIG. 5A.

The second gNB 400B activates the PRS transmission and transmits S1012a PRS using the second PRS configuration.

The WD 500 performs S1012b a second positioning measurement on PRS received from the second gNBs 400A using the determined second positioning reference signal configuration satisfying the second positioning requirement. This step S1012 is similar to step S208 of FIG. 5B.

The WD 500 transmits S1013 a measurement report of the second positioning measurement to the LS 600. The measurement report may be indicative of a second estimated position of the WD 500. The measurement report may also comprise an indication as to which positioning step the positioning measurement relates to, such as an indication as to which positioning requirement the second measurement satisfies, such as e.g. a fine or a high accuracy positioning measurement. This step S1013 is similar to the step S209 of FIG. 5A and step S108 of FIG. 4B.

The LS 600 obtains S1014 a second estimated position of the WD 500 based on the second measurement report received from the WD 500. This step corresponds to step S108 of FIG. 4B.

Embodiments of methods and products (network node, radio network node and wireless device) according to the disclosure are set out in the following items:

Item 1. A method, performed by a network node in a wireless communications network, for supporting positioning of a wireless device, wherein the wireless communications network comprises a first set of radio network nodes having a first positioning reference signal configuration and a second set of radio network nodes having a second positioning reference signal configuration, wherein the first positioning reference signal configuration provides a different positioning requirement than the second reference signal configuration, wherein the method comprises:

signaling (S103), to the wireless device, a first positioning request comprising a first indication of a positioning requirement of a first positioning measurement, obtaining (S104) a first estimated position of the wireless device, based on a first positioning measurement for the wireless device, wherein the first positioning measurement is associated with the first set of radio network nodes, signaling (S106), to a subset of the second set of radio network nodes, an indication to participate in the second positioning measurement, and signaling (S107), to the wireless device, a second positioning request comprising a second indication of a positioning requirement of a second positioning measurement, wherein the second indication of the positioning requirement of the second positioning measurement indicates a different positioning requirement than the first indication of the positioning requirement.

Item 2. The method according to Item 1, wherein the method comprises:

signaling (S102), to the wireless device, the first and the second reference signal configurations of the first and second set of radio network nodes, wherein the signaling comprises an indication of the positioning requirement of the first and the second reference signal configurations.

Item 3. The method according to any one of the previous Items, wherein signaling (S106) the indication to participate in the second positioning measurement comprises:

transmitting (S106A) an indication to activate transmission of reference signals using the second reference signal configuration.

Item 4. The method according to any one of the previous Items, wherein the first and/or second positioning reference signal configuration comprises a resource configuration for carrying reference signals during the positioning measurement, wherein the resource configuration of the second positioning reference signal configuration is different than the resource configuration of the first positioning reference signal configuration.

Item 5. The method according to Item 4, wherein the beam configuration of the second positioning reference signal configuration comprises a higher number of beams and/or narrower beams than the beam configuration of the first reference signal configuration.

Item 6. The method according to any one of the previous Items, wherein the positioning reference signal configuration, comprises a transmission power per resource element for transmitting positioning reference signals, and wherein the transmission power per resource element of the second positioning reference signal configuration is lower than a transmission power per resource element of the first positioning reference signal configuration.

Item 7. The method according to any one of the previous Items, wherein the positioning reference signal configuration comprises a resource allocation in time and/or in frequency for transmitting positioning reference signals, wherein the resource allocation of the second positioning reference signal configuration has a larger bandwidth and/or a larger time span than the resource allocation of the first positioning reference signal configuration.

Item 8. The method according to any one of the previous Items, wherein the positioning reference signal configurations indicate a periodicity for transmitting reference signals, wherein the periodicity of the second positioning reference signal configuration is more frequent than a periodicity of the first positioning reference signal configuration.

Item 9. The method according to any one of the previous Items, wherein the method comprises:

determining (S105), based on the first estimated position of the wireless device, the subset of the second set of radio network nodes that is to participate in a second positioning measurement for the wireless device.

Item 10. The method according to any one of the previous Items, wherein signaling (S106) an indication to participate in the second positioning measurement comprises:

transmitting (S106B), to the subset of the second set of radio network nodes, control signaling indicative of active resources for transmitting reference signals for positioning to be used for the second positioning measurement, wherein the active resources are a subset of the resources available to the subset of the second set of radio network nodes.

Item 11. The method according to any one of the previous Items, wherein signaling (S106) an indication to participate in the second positioning measurement comprises:

transmitting (S106C), to the subset of the second set of radio network nodes, control signaling indicative of a power level of each resource for transmitting reference signals for positioning, to be used for the second positioning measurement.

Item 12. The method according to any one of the Items 9 to 11, wherein signaling (S106) an indication to participate in the second positioning measurement comprises:

transmitting (S106D), to the subset of the second set of radio network nodes, control signaling indicative of a duration of the participation in the second positioning measurement.

Item 13. The method according to any one of the previous Items, wherein the subset of the second set of radio network nodes is associated with a geographical area of the first estimated position.

Item 14. The method according to any one of the previous Items, wherein the method further comprises:

obtaining (S108) a second estimated position of the wireless device based on the second positioning measurement.

Item 15. The method according to any one of the previous Items, wherein the method further comprises:

obtaining (S101), from the plurality of radio network nodes, the reference signal configuration of the first and second set of radio network nodes.

Item 16. The method according to any one of the previous Items, wherein the positioning requirement is a positioning accuracy and/or a positioning latency.

Item 17. A method, performed in a wireless device in a wireless communications network, for supporting positioning of the wireless device, wherein the wireless communications network comprises a first set of radio network nodes having a first positioning reference signal configuration and a second set of radio network nodes having a second positioning reference signal configuration, wherein the first reference signal configuration provides a different positioning requirement than the second reference signal configuration, the method comprising:

obtaining (S202) a first positioning request comprising a first requirement indication, wherein the first requirement indication indicates a positioning requirement of a first positioning measurement, participating (S204) in the first positioning measurement based on a first reference signal configuration, wherein the first reference signal configuration is determined based on the first requirement indication, obtaining (S206) a second positioning request comprising a second requirement indication, wherein the second requirement indication indicates a positioning requirement of a second positioning measurement, wherein the second requirement indication indicates a different positioning requirement than the first requirement indication, and participating (S208) in a second positioning measurement using the second reference signal configuration, wherein the second reference signal configuration is determined based on the second requirement indication.

Item 18. The method according to Item 17, wherein the method comprises:

receiving (S202), from the network node, the respective first and second positioning reference signal configurations of the respective first and second set of radio network nodes comprising an indication of the respective positioning requirement of the respective first and second reference signal configurations.

Item 19. The method according to Item 17 or 18, wherein the method comprises:

determining (S207), based on the second requirement indication, the positioning reference signal configuration to be used for the second positioning measurement, wherein the reference signal configuration is selected so that the second measurement satisfies the second requirement indication.

Item 20. The method according to any one of the Items 17 to 19, wherein participating (S208) in the second positioning measurement comprises:

measuring (S208A) on reference signals received using the second positioning reference signal configuration.

Item 21. The method according to Item 17 to 20, wherein the method comprises:

providing (S209), to the network node, a measurement report for the second positioning measurement.

Item 22. The method according to any one of the Items 17 to 21, wherein the method comprises:

providing (S205), to the network node, a measurement report for the first positioning measurement.

Item 23. The method according to any one of the Items 17 to 22, wherein participating (S208) in the second positioning measurement comprises:

transmitting (S208B) reference signals using the second reference signal configuration.

Item 24. A method, performed in a radio network node, for supporting positioning of a wireless device, wherein the radio network node has a reference signal configuration for positioning, the method comprising:

receiving (S301), from a network node, an indication to participate in a positioning measurement for the wireless device, and participating (S303) in the positioning measurement for the wireless device based on the reference signal configuration for positioning.

Item 25. The method according to Item 24, wherein the reference signal configuration is initially inactive, and wherein the indication to participate in the positioning measurement indicates that the positioning reference signal configuration is to be activated.

Item 26. The method according to Item 25, wherein the method further comprises:

activating (S302) a transmission of positioning reference signals using the reference signal configuration.

Item 27. The method according to any one of the Items 24 to 26, wherein participating (S303) in the positioning measurement comprises:

transmitting (S303A) reference signals based on the positioning reference signal configuration.

Item 28. The method according to any one of Items 24 to 27, wherein participating (S303) in the positioning measurement comprises:

measuring (S303B) on reference signals received from the wireless device based on the positioning reference signal configuration.

Item 29. The method according to any one of the Items 24 to 28, wherein the method further comprises:

sending (S304), to the network node, a measurement report indicative of the positioning measurement for the wireless device.

Item 30. The method according to any one of the Items 24 to 29, wherein the radio network node has a plurality of positioning reference signal configurations and each positioning reference signal configuration corresponds to a positioning requirement, and wherein the indication to participate in a positioning measurement for the wireless device comprises an indication of a positioning requirement.

Item 31. The method according to any Item 30, wherein participating (S303) in the positioning measurement for the wireless device based on the reference signal configuration for positioning comprises:

selecting (S303C) the reference signal configuration out of the plurality of reference signal configurations to be used for the positioning measurement based on the indication of the positioning requirement.

Item 32. The method according to any one of the previous Items 24 to 31, wherein receiving (S301) the indication to participate in the positioning measurement comprises:

receiving (S301A) control signaling indicative of active resources for transmitting reference signals for positioning to be used for the second positioning measurement, wherein the active resources are a subset of the resources available to the radio network node.

Item 33. The method according to any one of the previous Items 24 to 32, wherein receiving (S301) the indication to participate in the positioning measurement comprises:

receiving (S301B) control signaling indicative of a power level of each resource for transmitting reference signals for positioning, to be used for the positioning measurement.

Item 34. A network node comprising a memory circuitry, a processor circuitry, and a wireless interface, wherein the wireless device is configured to perform any of the methods according to any of Items 1-16.

Item 35. A wireless device comprising a memory circuitry, a processor circuitry, and a wireless interface, wherein the wireless device is configured to perform any of the methods according to any of Items 17-23.

Item 36. A radio network node comprising a memory circuitry, a processor circuitry, and a wireless interface, wherein the radio network node is configured to perform any of the methods according to any of Items 24-33.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-10 comprises some circuitries or operations which are illustrated with a solid line and some circuitries or operations which are illustrated with a dashed line. The circuitries or operations which are comprised in a solid line are circuitries or operations which are comprised in the broadest example embodiment. The circuitries or operations which are comprised in a dashed line are example embodiments which may be comprised in, or a part of, or are further circuitries or operations which may be taken in addition to the circuitries or operations of the solid line example embodiments. It should be appreciated that these operations need not be performed in order presented. Furthermore, it should be appreciated that not all of the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the example embodiments may be implemented at least in part by means of both hardware and software, and that several "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

The invention claimed is:

1. A method, performed by a network node in a wireless communications network, for supporting positioning of a wireless device, wherein the wireless communications network comprises a first set of radio network nodes having a first positioning reference signal configuration and a second set of radio network nodes having a second positioning reference signal configuration, wherein the first positioning reference signal configuration provides a different positioning requirement than the second reference signal configuration, wherein the method comprises:

signaling, to the wireless device, a first positioning request comprising a first indication of a positioning requirement of a first positioning measurement;

obtaining a first estimated position of the wireless device, based on a first positioning measurement for the wireless device, wherein the first positioning measurement is associated with the first set of radio network nodes;

determining, based on the first estimated position of the wireless device, a subset of the second set of radio network nodes that is to participate in a second positioning measurement for the wireless device;

signaling, to the subset of the second set of radio network nodes, an indication to participate in the second positioning measurement; and signaling, to the wireless device, a second positioning request comprising a second indication of a positioning requirement of a second positioning measurement, wherein the second indication of the positioning requirement of the second positioning measurement indicates a different positioning requirement than the first indication of the positioning requirement.

2. The method according to claim 1, wherein the method comprises:

signaling, to the wireless device, the first and the second reference signal configurations of the first and second sets of radio network nodes, wherein the signaling comprises an indication of the positioning requirement of the first and the second reference signal configurations.

3. The method according to claim 1, wherein the first and/or second positioning reference signal configuration comprises a resource configuration for carrying reference signals during the positioning measurement, wherein the resource configuration of the second positioning reference signal configuration is different than the resource configuration of the first positioning reference signal configuration.

4. The method according to claim 3, wherein a beam configuration of the second positioning reference signal configuration comprises a higher number of beams and/or narrower beams than a beam configuration of the first reference signal configuration.

5. The method according to claim 1, wherein the positioning reference signal configuration, comprises a transmission power per resource element for transmitting positioning reference signals, and wherein the transmission power per resource element of the second positioning reference signal configuration is lower than a transmission power per resource element of the first positioning reference signal configuration.

6. The method according to claim 1, wherein the positioning reference signal configuration comprises a resource allocation in time and/or in frequency for transmitting positioning reference signals, wherein the resource allocation of the second positioning reference signal configuration has a larger bandwidth and/or a larger time span than the resource allocation of the first positioning reference signal configuration.

7. The method according to claim 1, wherein the positioning reference signal configurations indicate a periodicity for transmitting reference signals, wherein the periodicity of the second positioning reference signal configuration is more frequent than a periodicity of the first positioning reference signal configuration.

8. The method according to claim 1, wherein signaling the indication to participate in the second positioning measurement comprises:

transmitting an indication to activate transmission of reference signals using the second reference signal configuration.

9. The method according to claim 1, wherein signaling an indication to participate in the second positioning measurement comprises:

transmitting, to the subset of the second set of radio network nodes, control signaling indicative of active resources for transmitting reference signals for positioning to be used for the second positioning measurement, wherein the active resources are a subset of the resources available to the subset of the second set of radio network nodes.

10. The method according to claim 1, wherein signaling an indication to participate in the second positioning measurement comprises:

transmitting, to the subset of the second set of radio network nodes, control signaling indicative of a power level of each resource for transmitting reference signals for positioning, to be used for the second positioning measurement.

11. The method according to claim 1, wherein signaling an indication to participate in the second positioning measurement comprises:

transmitting, to the subset of the second set of radio network nodes, control signaling indicative of a duration of the participation in the second positioning measurement.

12. The method according to claim 1, wherein the subset of the second set of radio network nodes is associated with a geographical area of the first estimated position.

13. The method according to claim 1, wherein the method further comprises:

obtaining a second estimated position of the wireless device based on the second positioning measurement.

14. The method according to claim 1, wherein the method further comprises:

obtaining, from a radio network node of the wireless communications network, the reference signal configuration of the first and second sets of radio network nodes.

15. The method according to claim 1, wherein the positioning requirement is a positioning accuracy and/or a positioning latency.

16. A method, performed in a wireless device in a wireless communications network, for supporting positioning of the wireless device, wherein the wireless communications network comprises a first set of radio network nodes having a first positioning reference signal configuration and a second set of radio network nodes having a second positioning reference signal configuration, wherein the first reference signal configuration provides a different positioning require- ment than the second reference signal configuration, the method comprising:

obtaining a first positioning request comprising a first requirement indication, wherein the first requirement indication indicates a positioning requirement of a first positioning measurement;

participating in the first positioning measurement based on a first reference signal configuration, wherein the first reference signal configuration is determined based on the first requirement indication;

obtaining a second positioning request comprising a sec- ond requirement indication, wherein the second requirement indication indicates a positioning require- ment of a second positioning measurement, wherein the second requirement indication indicates a different positioning requirement than the first requirement indi- cation;

participating in a second positioning measurement using the second reference signal configuration, wherein the second reference signal configuration is determined based on the second requirement indication; and providing a measurement report for the second position- ing measurement, the measurement report being indica- tive of a second estimated position of the wireless device based on the second positioning measurement.

17. The method according to claim 16, wherein the method further comprises:

receiving, from the network node, the respective first and second positioning reference signal configurations of the respective first and second set of radio network nodes comprising a respective indication of the posi- tioning requirement of the respective first and second reference signal configurations.

18. The method according to claim 16, wherein the method further comprises:

determining, based on the second requirement indication, the positioning reference signal configuration to be used for the second positioning measurement, wherein the reference signal configuration is selected so that the second measurement satisfies the second requirement indication.

19. A method, performed in a radio network node, for supporting positioning of a wireless device, wherein the radio network node has a reference signal configuration for positioning, the method comprising:

receiving, from a network node, an indication to partici- pate in a positioning measurement for the wireless device;

activating a transmission of positioning reference signals using the reference signal configuration, wherein the reference signal configuration is initially inactive, and wherein the indication to participate in the positioning measurement indicates that the positioning reference signal configuration is to be activated; and participating in the positioning measurement for the wire- less device based on the reference signal configuration for positioning.

* * * * *